(12) United States Patent
Dahle et al.

(10) Patent No.: US 12,185,874 B2
(45) Date of Patent: *Jan. 7, 2025

(54) PORTABLE OUTDOOR COOKING DEVICE, SYSTEM, AND ACCESSORY THEREOF

(71) Applicant: North Atlantic Imports, LLC, Logan, UT (US)

(72) Inventors: Roger Dahle, Providence, UT (US); Steve L Puertas, Wellsville, UT (US); Jeffrey D. Clark, Logan, UT (US); Christopher L Hanks, Nibley, UT (US)

(73) Assignee: North Atlantic Imports, LLC, Logan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,237

(22) Filed: Sep. 9, 2023

(65) Prior Publication Data

US 2024/0074613 A1  Mar. 7, 2024

Related U.S. Application Data

(60) Continuation of application No. 17/184,535, filed on Feb. 24, 2021, now Pat. No. 11,751,723, which is a continuation-in-part of application No. 17/143,837, filed on Jan. 7, 2021, which is a division of application No. 16/366,991, filed on Mar. 27, 2019, now Pat. No. 10,888,193, which is a continuation-in-part of application No. 15/885,313, filed on Jan. 31, 2018, now Pat. No. 10,588,461.

(60) Provisional application No. 62/650,586, filed on Mar. 30, 2018, provisional application No. 62/452,483, filed on Jan. 31, 2017.

(51) Int. Cl.
*A47J 37/07* (2006.01)
*A47J 47/00* (2006.01)
*B65F 1/14* (2006.01)

(52) U.S. Cl.
CPC ....... *A47J 37/0704* (2013.01); *A47J 37/0763* (2013.01); *A47J 37/0786* (2013.01); *A47J 47/005* (2013.01); *B65F 1/1415* (2013.01)

(58) Field of Classification Search
None
See application file for complete search history.

(56) References Cited

U.S. PATENT DOCUMENTS

| | | |
|---|---|---|
| 261,618 A | 7/1882 | Lufkin |
| 266,704 A | 10/1882 | Lufkin |
| 277,772 A | 5/1883 | Nelson |
| 307,929 A | 11/1884 | Edwards |
| 447,686 A | 3/1891 | Holladay |
| 725,538 A | 4/1903 | Brown |
| 973,414 A | 10/1910 | Eastham |
| 1,452,144 A | 4/1923 | Carlin |

(Continued)

*Primary Examiner* — David J Laux
(74) *Attorney, Agent, or Firm* — David L. Stott

(57) ABSTRACT

A waste bag holder pivotably coupled to an outdoor cooking station. The waste bag holder is a rod structure with multiple bends along its length to define a u-shaped portion and first and second engaging portions. The u-shaped portion is configured to support a waste bag. The first and second engaging portions are sized and configured to couple to coupling structure to facilitate the waste bag holder to be pivotably moveable between a use position and a stowed position.

20 Claims, 21 Drawing Sheets

(56) References Cited

U.S. PATENT DOCUMENTS

| | | | |
|---|---|---|---|
| 1,925,500 A | 9/1933 | Richard | |
| 4,886,045 A * | 12/1989 | Ducate, Jr. | A47J 37/0713 126/41 R |
| 4,899,725 A * | 2/1990 | Barron, Jr. | A47J 37/0713 126/41 R |
| 5,014,944 A | 5/1991 | Malik et al. | |
| 5,224,676 A | 7/1993 | Johnston | |
| 5,323,758 A | 6/1994 | Minshall et al. | |
| 5,341,793 A * | 8/1994 | Brown | A47J 37/0786 126/41 R |
| 5,360,189 A | 11/1994 | Hart | |
| 5,579,755 A | 12/1996 | Johnston | |
| 5,865,099 A | 2/1999 | Waugh | |
| 5,996,983 A * | 12/1999 | Laurenzi | A47J 47/005 269/15 |
| 6,026,972 A * | 2/2000 | Makowski | B65F 1/1415 220/495.08 |
| 6,062,129 A | 5/2000 | Tippmann et al. | |
| 6,092,767 A | 7/2000 | Schrager | |
| 6,142,140 A | 11/2000 | Schumaker | |
| 6,145,431 A | 11/2000 | Tippmann et al. | |
| 6,209,596 B1 | 4/2001 | Wong | |
| 6,324,998 B1 | 12/2001 | Alden et al. | |
| 6,354,548 B1 | 3/2002 | Stephen et al. | |
| 6,488,241 B1 | 12/2002 | Kyte et al. | |
| 6,994,336 B2 * | 2/2006 | Loo | A47J 47/005 269/302.1 |
| 7,163,011 B2 * | 1/2007 | Pestrue | A47J 37/0713 126/41 R |
| 7,243,884 B2 | 7/2007 | Lawson et al. | |
| 7,284,549 B1 * | 10/2007 | Eby | A47J 37/0713 126/25 R |
| 7,328,696 B2 | 2/2008 | Rodriguez | |
| 7,404,531 B2 | 7/2008 | McConnell | |
| 8,051,768 B2 | 11/2011 | Stephen et al. | |
| 8,091,840 B1 | 1/2012 | Ortiz-Torres | |
| 8,220,789 B2 * | 7/2012 | Pourounidis | A47J 47/005 83/167 |
| 8,360,407 B2 * | 1/2013 | Kent | A47J 47/005 269/302.1 |
| 8,387,610 B1 * | 3/2013 | Candelaria, Jr. | A47J 37/0786 126/30 |
| D694,056 S | 11/2013 | Dahle | |
| 8,590,524 B2 | 11/2013 | Ducate, Jr. | |
| 8,770,531 B2 | 7/2014 | Cundy | |
| 9,155,427 B1 * | 10/2015 | Kumar | A47J 47/005 |
| 9,271,607 B2 * | 3/2016 | Chung | A47J 37/0786 |
| 9,296,506 B2 | 3/2016 | Cundy | |
| 9,492,031 B2 * | 11/2016 | Diaz | A47J 37/0623 |
| 9,565,974 B2 * | 2/2017 | Nordstrom | A47J 47/005 |
| D794,895 S | 8/2017 | Goodman et al. | |
| 9,782,039 B2 | 10/2017 | Ortner et al. | |
| 9,826,859 B1 | 11/2017 | Steele | |
| D852,010 S * | 6/2019 | Banovic | D7/698 |
| 10,588,461 B2 * | 3/2020 | Dahle | A47B 31/02 |
| 11,751,723 B2 * | 9/2023 | Dahle | B65F 1/1415 126/25 R |
| 2006/0194456 A1 * | 8/2006 | Cawley | A47J 47/005 439/74 |
| 2008/0245357 A1 * | 10/2008 | Meether | A47J 37/0786 126/25 R |
| 2010/0252694 A1 | 10/2010 | Bathols et al. | |
| 2010/0275899 A1 * | 11/2010 | Ducate, Jr. | A47J 37/0786 220/737 |
| 2011/0273887 A1 * | 11/2011 | Nilssen, II | F21V 21/14 362/277 |
| 2012/0181403 A1 | 7/2012 | Lee | |
| 2013/0112802 A1 * | 5/2013 | Griggs | A47J 37/0786 242/590 |
| 2013/0334375 A1 * | 12/2013 | Chiarella | B65F 1/1415 297/188.14 |
| 2016/0001973 A1 * | 1/2016 | Castro | B65F 1/068 211/85.15 |
| 2016/0023846 A1 | 1/2016 | Wheeler | |
| 2016/0073823 A1 * | 3/2016 | Van Gelder | A47J 37/0786 126/25 R |
| 2016/0150916 A1 * | 6/2016 | McNally | A47J 47/005 269/15 |
| 2017/0027314 A1 * | 2/2017 | Guzman | A47B 13/14 |

* cited by examiner

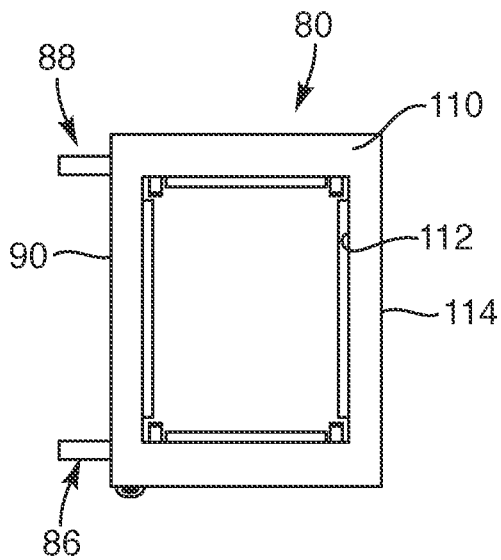
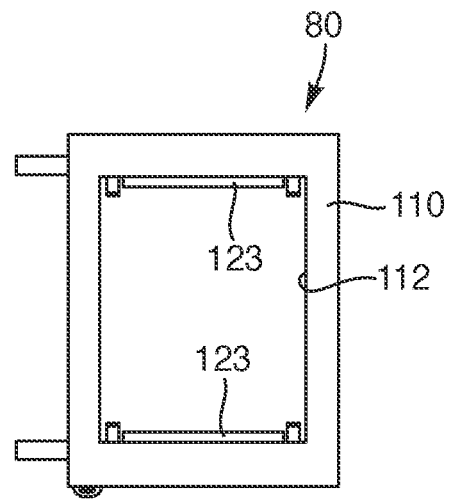
FIG. 3A  FIG. 3B
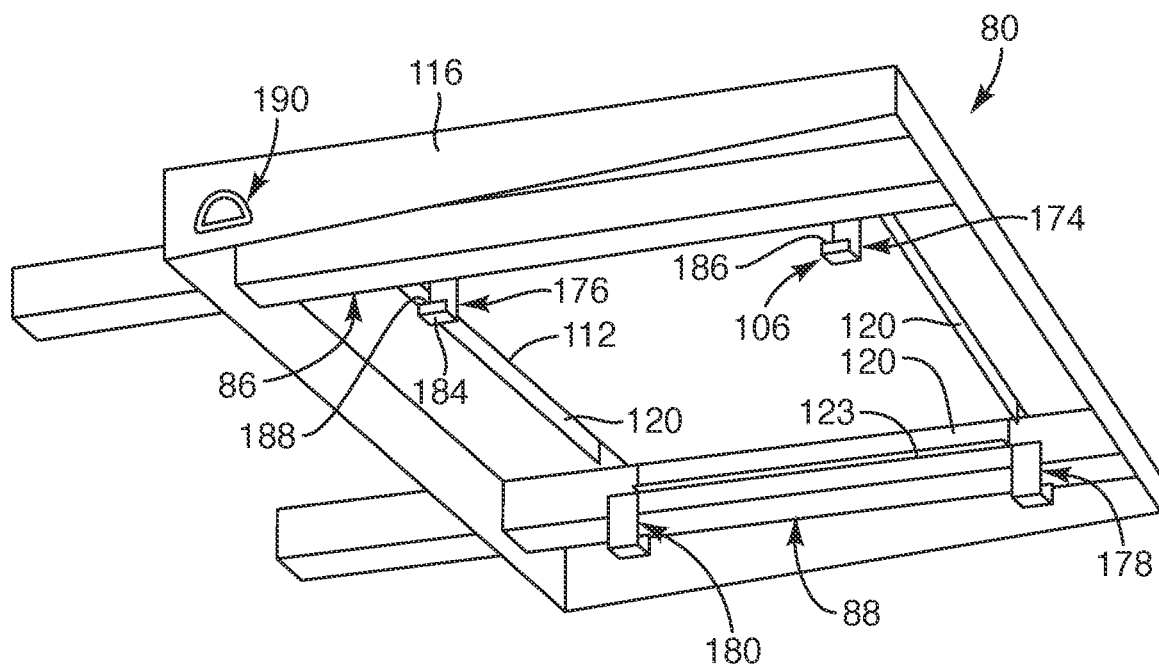
FIG. 4

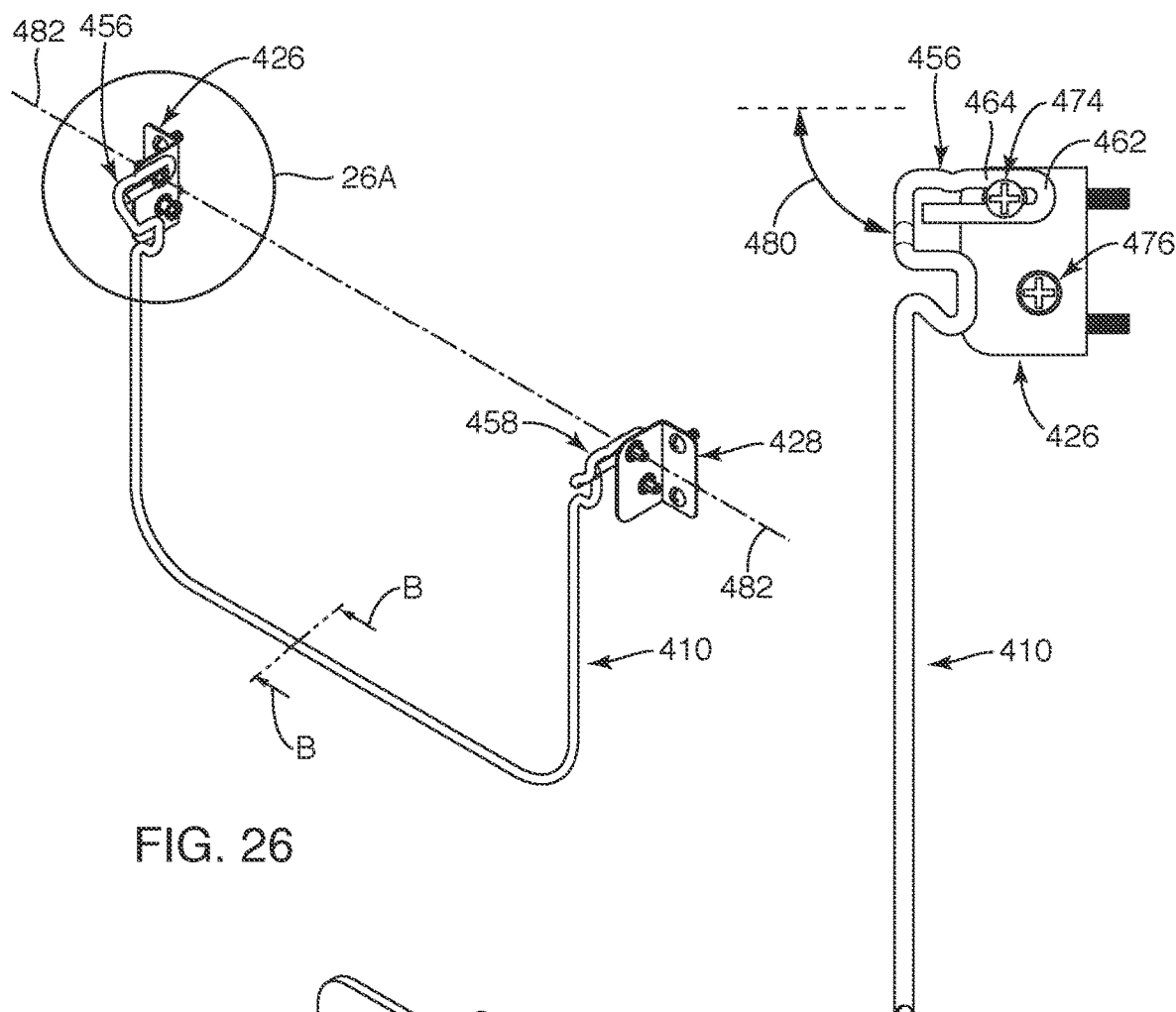
FIG. 26
FIG. 26B
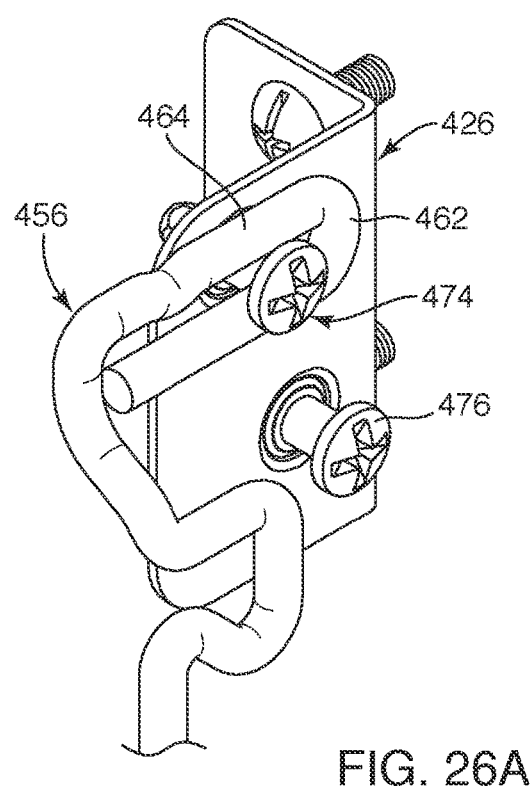
FIG. 26A

PORTABLE OUTDOOR COOKING DEVICE, SYSTEM, AND ACCESSORY THEREOF

CROSS-REFERENCE TO RELATED APPLICATIONS

This application is a continuation of U.S. patent application Ser. No. 17/184,535, filed Feb. 24, 2021, which is a continuation-in-part of U.S. patent application Ser. No. 17/143,837, filed Jan. 7, 2021, which is a divisional of U.S. patent application Ser. No. 16/366,991, filed Mar. 27, 2019, now U.S. Pat. No. 10,888,193, which claims the benefit of U.S. Provisional Application No. 62/650,586, filed Mar. 30, 2018, the disclosures of which are hereby incorporated by reference in their entirety. Further, U.S. patent application Ser. No. 16/366,991 is a continuation-in-part of U.S. patent application Ser. No. 15/885,313, filed Jan. 31, 2018, now U.S. Pat. No. 10,588,461, which claims the benefit of U.S. Provisional Application No. 62/452,483, filed Jan. 31, 2017, the disclosures of which are hereby incorporated by reference in their entirety.

TECHNICAL FIELD

The present invention relates generally to portable outdoor cooking stations and, more specifically, the present invention relates to an accessory component that may be employed with portable outdoor cooking stations.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

A griddle is a cooking device consisting of a broad flat surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame or electrical elements. Using a griddle placed directly on a barbeque grill or over flame burners has also become popular when cooking foods not as well suited for cooking directly on a grill over an open flame.

Griddles are often employed for cooking large quantities of food. Managing the food properly, especially in an outdoor setting, often becomes problematic while also maintaining a clean cooking area. Managing the limited space available for the food and waste while cooking is also challenging. As such, it would be advantageous to provide a portable outdoor cooking station and/or accessory components for portable outdoor cooking stations, or the like, that limits the challenges while cooking in an outdoor setting.

BRIEF SUMMARY OF THE INVENTION

Embodiments of the present invention are directed to various devices and systems of a portable outdoor cooking station and/or an accessory component thereof, such as a waste bag holder device. In one embodiment, the waste bag holder device is configured to hold a waste bag adjacent a main body of an outdoor cooking station. The waste bag holder device includes first and second coupling structures, first and second abutment structures, and a waste bag holder. The first and second coupling structures are each configured to be operatively coupled to the main body. Further, the first and second coupling structures are configured to be aligned with each other so as to define a pivot axis. The first and second abutment structures are each configured to be operatively coupled to the main body such that the first and second abutment structures are configured to be positioned adjacent the first and second coupling structures, respectively. The waste bag holder extends with rod structure and is configured to be pivotably coupled to the first and second coupling structures. Further, the waste bag holder includes a u-shaped portion and first and second engaging portions. The u-shaped portion extends to first and second corner portions such that the u-shaped portion and the first and second corner portions are sized and configured to facilitate holding the waste bag thereto. The first and second engaging portions include the rod structure extending from the respective first and second corner portions so that the first and second engaging portions are pivotably coupled to the first and second coupling structures, respectively. With this arrangement, the waste bag holder is pivotably moveable about the pivot axis between a use position and a stowed position.

In another embodiment, in the use position, the first and second engaging portions abut against the first and second abutment structures, respectively, so that the u-shaped portion is positionable within a generally horizontally oriented plane. In another embodiment, in the stowed position, the u-shaped portion is positionable within a generally vertically oriented plane such that the u-shaped portion extends along a vertically oriented surface of the main body.

In another embodiment, the rod structure extends to define a length extending between free ends such that the rod structure extends with multiple bends along the length. In still another embodiment, the rod structure is a single piece member extending to define a length between free ends, the rod structure extending with multiple bends along the length so as to define the waste bag holder.

In another embodiment, the first and second engaging portions each extend to define a first radial bend and a second radial bend with a first elongate portion extending therebetween, the waste bag holder pivotably moveable between the use and stowed positions such that the second radial bend rotates about the pivot axis and the first and second coupling structures. In still another embodiment, the first and second engaging portions each extend to define a first radial bend and a second radial bend with a first elongate portion extending therebetween, the waste bag holder positionable in the use position with the first radial bend of the first and second engaging portions positioned over the first and second coupling structures, respectively, and the first elongate portion of the first and second engaging portions positioned against the first and second abutment structures, respectively. In yet another embodiment, the first and second engaging portions each extend to define a first radial bend and a second radial bend with a first elongate portion extending therebetween, wherein, prior to the waste bag holder being moved to the stowed position, the waste bag holder is moved to a lifted position such that the second radial bend is positioned adjacent the first and second coupling structures so that the waste bag holder is pivotable about the pivot axis to move the waste bag holder to the stowed position.

In another embodiment, the first and second corner portions are defined by an angled extension, the angled extension extending relative to the u-shaped portion such that the first and second corner portions each extend with an acute angle. In another embodiment, the first and second coupling structures are directly coupled to first and second brackets, respectively, the first and second brackets configured to be directly coupled to the main body of the cooking station.

In accordance with another embodiment of the present invention, a waste bag holder device configured to hold a waste bag adjacent a main body of an outdoor cooking station is provided. The waste bag holder device includes first and second brackets and a waste bag holder. The first and second brackets are sized and configured to be coupled to the main body, the first and second brackets each including a coupling structure and an abutment structure. The coupling structure of the first and second brackets are aligned with each other so as to define a pivot axis. The waste bag holder extends with rod structure to define a u-shaped portion and first and second engaging portions, the u-shaped portion being sized and configured to facilitate holding the waste bag thereto. The first and second engaging portions are configured to be pivotably coupled to the coupling structure of the first and second brackets, respectively, such that the waste bag holder is configured to be pivotably moveable about the pivot axis to move the waste bag holder to a use position or a stowed position.

In another embodiment, wherein, in the use position, the first and second engaging portions abut against the first and second abutment structures, respectively, so that the u-shaped portion is positionable within a generally horizontally oriented plane. In another embodiment, wherein, in the stowed position, the u-shaped portion is positionable within a generally vertically oriented plane such that the u-shaped portion extends along a vertically oriented surface of the main body.

In another embodiment, the rod structure extends to define a length extending between free ends such that the rod structure extends with multiple bends along the length. In still another embodiment, the rod structure is a single piece member extending to define a length between free ends, the rod structure extending with multiple bends along the length so as to define the waste bag holder.

In another embodiment, the first and second engaging portions each extend to define a first radial bend and a second radial bend with a first elongate portion extending therebetween, the waste bag holder pivotably moveable between the use and stowed positions such that the second radial bend rotates about the pivot axis and the coupling structure. In yet another embodiment, the first and second engaging portions each extend to define a first radial bend and a second radial bend with a first elongate portion extending therebetween, the waste bag holder positionable in the use position with the first radial bend positioned over the coupling structure, and the first elongate portion positioned against the abutment structure. In still another embodiment, the first and second engaging portions each extend to define a first radial bend and a second radial bend with a first elongate portion extending therebetween, wherein, prior to the waste bag holder being moved to the stowed position, the waste bag holder is moved to a lifted position such that the second radial bend is positioned adjacent the coupling structure so that the waste bag holder is pivotable about the pivot axis to move the waste bag holder to the stowed position.

In accordance with another embodiment of the present invention, an outdoor cooking station includes a main body, a side shelf system, and a waste bag holder. The main body includes a frame structure, the main body having a front panel extending between opposite first and second sides of the main body. Further, the main body includes at least two side legs extending downward from the main body and the front panel includes one or more knobs disposed thereon for controlling one or more heating elements within the main body. The at least two side legs include a vertical side panel sized to extend between the at least two legs. The side shelf system includes a side shelf and a cutting board. The side shelf is configured to be coupled to the main body, the side shelf defining an upward facing surface with an opening defined therein. The cutting board is sized and configured to be positioned within the opening defined in the side shelf, the cutting board positioned on a ledge extending from structure of the side shelf. The waste bag holder is sized and configured to be removably positioned over a top edge of the vertical side panel. With this arrangement, the removable waste bag holder, upon being positioned over the top edge of the vertical side panel, is configured to extend horizontally below the side shelf.

In another embodiment, the waste bag holder includes a first engaging portion and a second engaging portion spaced apart from each other, the first and second engaging portions extending to a u-shaped structure. In another embodiment, the waste bag holder includes a first engaging portion and a second engaging portion, each of the first and second engaging portions including a single back extension and a front extension. Such single back extension extending linearly along an entire length of the single back extension to a free end, wherein, upon the waste bag holder being positioned over the vertical side panel, the front extension includes a single point contact with a vertically extending front surface of the vertical side panel. In still another embodiment, the waste bag holder includes a first engaging portion and a second engaging portion each spaced apart from each other, the first and second engaging portions each having a single point contact with a vertically extending front surface of the vertical side panel.

In another embodiment, the waste bag holder includes a single rod type elongated structure with multiple bends therein. In another embodiment, the waste bag holder includes a u-shaped structure extending below the side shelf.

In another embodiment, the side shelf system further includes a holder device configured to be operatively coupled to the frame structure, the holder device having an elongated portion with a free end such that the elongated portion extends substantially horizontal relative to the upper flat surface of the side shelf and below the side shelf. In yet another embodiment, the side shelf system further includes a food pan having a lip extending along an upper side of the food pan, the food pan sized and configured to be positioned through the opening such that the lip is positionable onto the ledge with the cutting board positionable over the lip of the food pan.

In accordance with another embodiment of the present invention, a waste bag holder device for removably positioning over a vertical side panel, the waste bag holder device for holding a waste bag therewith, is provided. The waste bag holder device includes a u-shaped structure and first and second engaging portions. The u-shaped structure includes ends extending to a corner portion, the u-shaped structure sized to receive the waste bag therewith. The first and second engaging portions each include a back extension with a free end, the back extension configured to extend vertically and linearly along an entire length of the back extension, the back extension extending to a top extension so as to extend around a top edge of the vertical side panel to then extend downward to define a front extension. The front extension extends at an acute angle relative to the back extension and includes a surface to abut against the vertical side panel, the front extension extending to a lower extension extending away from the front extension to then bend and extend upward to the corner portion.

In one embodiment, the first and second engaging portions and the u-shaped structure is a single rod structure with multiple bends therein. In another embodiment, the u-shaped structure includes an outer extension extending between a first leg extension and a second leg extension, the first leg extension and the first engaging portion extending within a single first plane and the second leg extension and the second engaging portion extending within a single second plane. In a further embodiment, the single first plane and the single second plane extend substantially parallel relative to each other. In another further embodiment, the outer extension extends substantially perpendicular relative to the single first plane and the single second plane.

In another embodiment, the lower extension defines a longitudinal axis, the longitudinal axis extending substantially parallel with one of a first and second leg extension defined by the u-shaped structure. In yet another embodiment, the corner portion includes a junction between a leg extension and a holding extension, the holding extension extending at an acute angle relative to leg extension.

In accordance with another embodiment of the present invention, a method of collecting waste while cooking a food product is provided. The method steps include: providing an outdoor cooking station having a main body with a frame structure, the main body having a front panel extending between opposite first and second sides of the main body, the main body having at least two side legs extending downward from the main body, the front panel having one or more knobs disposed thereon for controlling one or more heating elements within the main body, the at least two side legs having a vertical side panel sized to extend between the at least two legs, one of the first and second sides including a side shelf configured to be coupled to the main body, the side shelf defining an upward facing surface with an opening defined therein, the opening sized to receive a cutting board with a through hole defined therein, the cutting board positioned on a ledge extending from structure of the side shelf; and removably positioning a waste bag holder over a top edge of the vertical side panel such that a u-shaped structure of the waste bag holder extends horizontally a distance below the side shelf so that a waste bag removably positioned around the u-shaped structure is positioned directly below the opening of the side shelf.

In accordance with another embodiment of the present invention, an outdoor cooking station is provided. The outdoor cooking station includes a main body and a waste bag holder. The main body includes a frame structure and a front panel, the front panel extending between opposite first and second sides of the main body. Further, the front panel includes one or more knobs disposed thereon for controlling one or more heating elements within the main body. The main body includes a vertically extending side panel positioned on at least one of the first and second sides of the main body, the main body including a side shelf coupled to one of the first and second sides of the main body. The waste bag holder is sized and configured to be removably positioned over a top edge of the vertically extending side panel. With this arrangement, the removable waste bag holder, upon being positioned over the top edge of the vertically extending side panel, is configured to extend horizontally below the side shelf.

In accordance with another embodiment of the present invention, an outdoor cooking station is provided. The cooking station includes a main body and a waste bag holder. The main body includes a frame structure and a front panel extending between opposite first and second sides of the main body. The front panel includes one or more knobs disposed thereon for controlling one or more heating elements within the main body. The main body includes a side surface defining a first aperture and a second aperture therein, the first and second apertures defined in the side surface in one of the first and second sides of the main body. The waste bag holder includes a single rod structure with a first free end and a second free end, the first and second free ends of the single rod structure configured to be positioned within the first and second apertures defined in the side surface of the one of the first and second sides of the main body.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 3A is a top view of a side shelf, according to another embodiment of the present invention;

FIG. 3B is a top view of another embodiment of a side shelf, according to the present invention;

FIG. 4 is a bottom perspective view of a side shelf, depicting hooks and ledges for the side shelf system, according to another embodiment of the present invention;

FIG. 26 is a perspective view of the waste bag holder, depicting the waste bag holder moved to the stowed position or vertical position relative to the brackets, according to another embodiment of the present invention;

FIG. 26A is an enlarged view of the waste bag holder taken from region 26A of FIG. 26, according to another embodiment of the present invention;

FIG. 26B is a cross-sectional view of the waste bag holder taken from section line B-B of FIG. 26, according to another embodiment of the present invention;

DETAILED DESCRIPTION OF THE INVENTION

Figure 1:
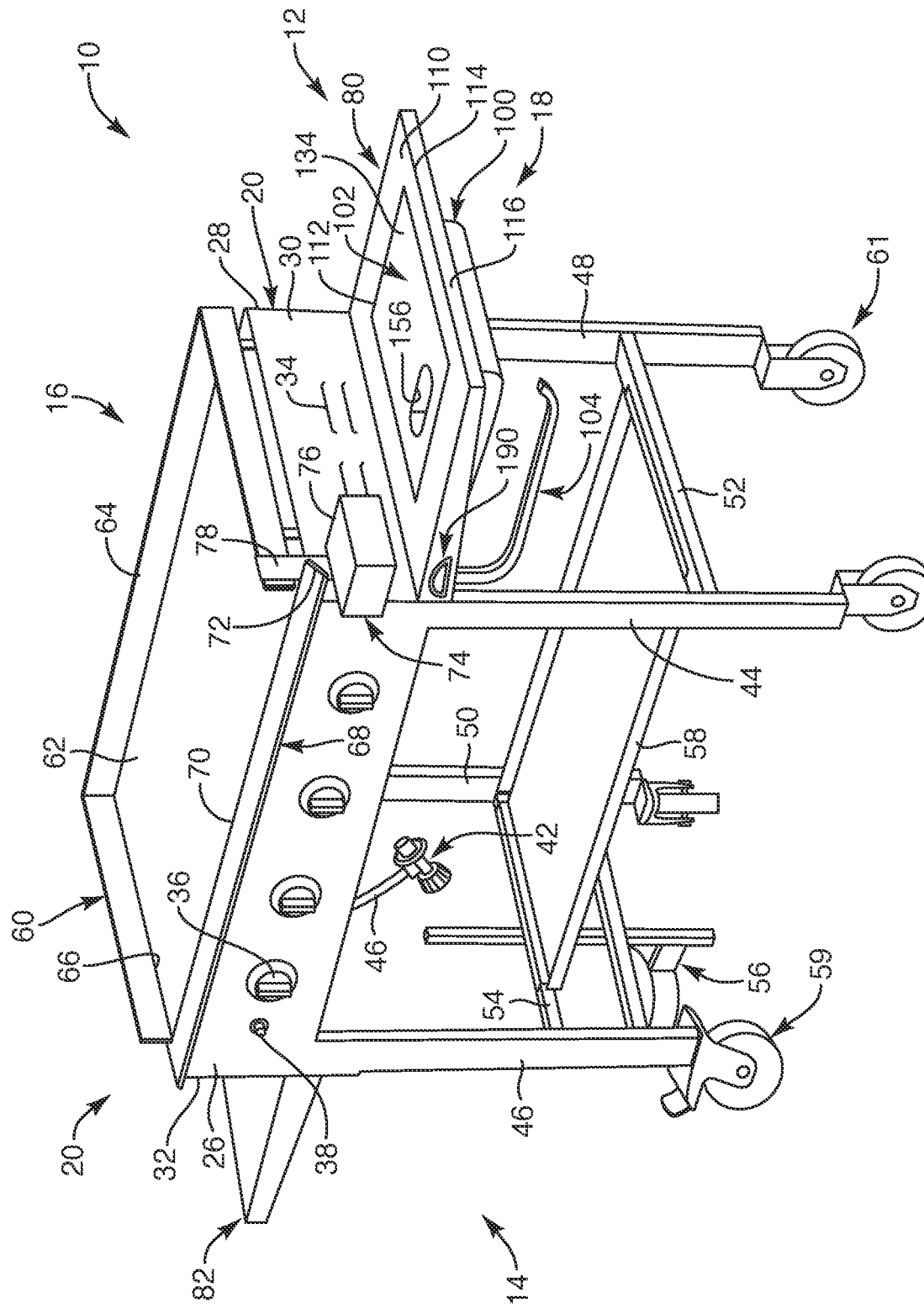
FIG. 1 is a perspective view of a portable outdoor cooking station with a side shelf system, depicting the cooking station with a griddle positioned thereon, according to one embodiment of the present invention.
Figure 2:
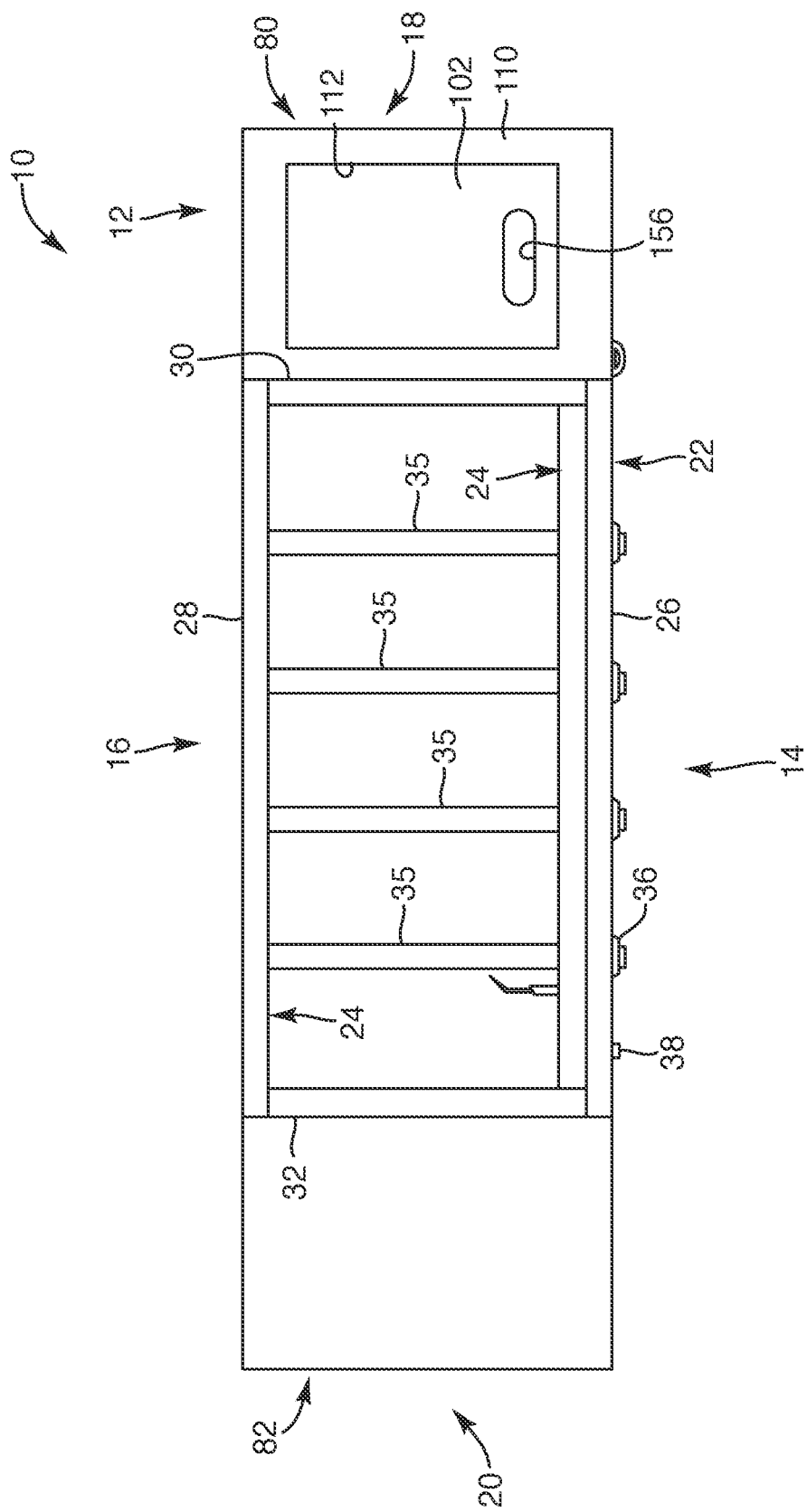
FIG. 2 is a top view of the portable outdoor cooking station, depicting the cooking station without the griddle positioned thereon, according to another embodiment of the present invention.
Figure 3:
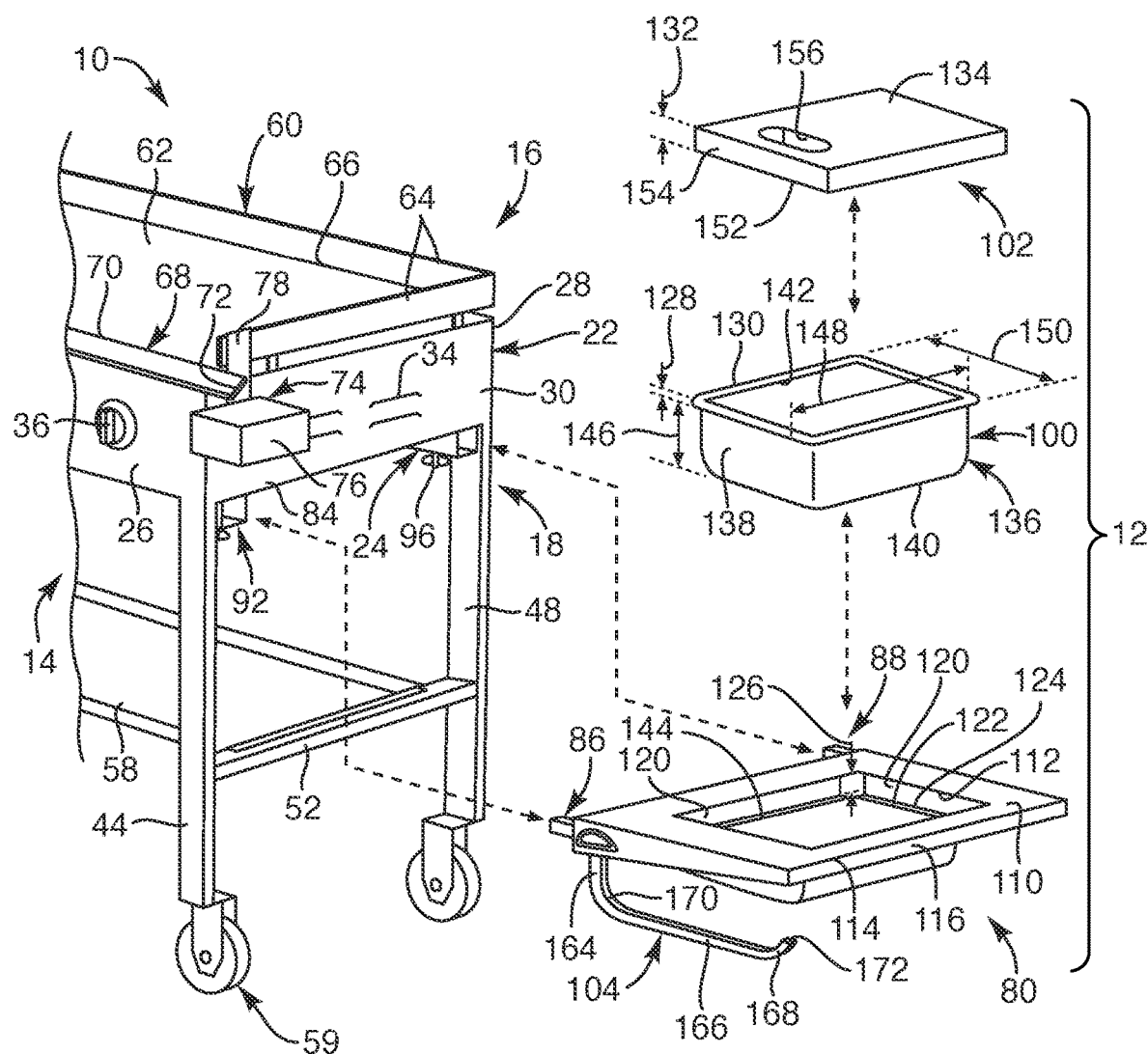
FIG. 3 is an exploded view of the portable outdoor cooking station and the side shelf system, according to another embodiment of the present invention.

Referring to FIGS. 1 through 3, a portable outdoor cooking station 10 with a side shelf system 12 is provided. Such cooking station 10 is made for outdoor use and is sized and configured to be readily moveable such that the cooking station 10 is portable. Further, the portable outdoor cooking station may be of the type that is gas heated. In one embodiment, the side shelf system 12 may be sized and configured to maintain cooked or non-cooked food while improving cleanliness of a food preparation surface. The side shelf system 12 may also be sized and configured to maintain disposable cleaning supplies. In addition, the side shelf system 12 may be sized and configured to hold waste in a readily disposable manner as well as improving cleanliness of a food preparation surface. With this arrangement, the side shelf system 12 may be employed with the cooking station 10.

The cooking station 10 may include a front side 14, a rear side 16, a first side 18, and a second side 20, the front side 14 being the side a user may stand for cooking food and operating some of the controls of the cooking station 10. The cooking station 10 may include a main body 22. The main body 22 may include a frame structure 24 to which various housing or panel structures may be attached. For example, the frame structure 24 may include panel structures, such as a front wall 26, a rear wall 28, and first and second walls 30, 32. In one embodiment, the main body 22 may not include the rear wall 28. The first and second walls 30, 32 may include vents 34 or openings therein. The front wall 26 may include various components and controls positioned and secured therewith. The main body 22 may include one or more heating elements, such as four gas burners 35, extending between the front wall 26 and the rear wall 28 or rear side 16 of the main body 22. The gas burners may receive gas by rotating burner knobs 36 from an off-position to an on-position. Such burner knobs 36 may be coupled to the front wall 26 of the main body 22 and may each be aligned with a corresponding gas burner. Each of the burner knobs 36 may include the appropriate valves and components associated therewith configured to control gas being supplied to the gas burners, as known to one of ordinary skill in the art. Further, the main body 22 may also include an igniter switch 38. The igniter switch 38 may be positioned on the front wall 26 or panel sized and configured to ignite the particular gas burners corresponding with the burner knobs 36 rotated to the on-position. The gas burners may be fueled with gas, such as propane gas, with a propane gas tank (not shown) or fueled with natural gas, which may be coupled to the gas burners via a gas line 40 and connection valve 42 or the like. Although only some of the primary components for operating the cooking station 10 are described herein, the remaining components that may be needed for proper functioning of the cooking station may be incorporated herewith and into the cooking station 10 as known by one of ordinary skill in the art.

The cooking station 10 may include four legs. The four legs may extend downward from front and rear corners or sides of the main body 22 to define first and second front legs 44, 46 and first and second rear legs 48, 50. Further, the first front and rear legs 44, 48 may include one or more first cross-members 52 extending therebetween. Similarly, the second front and rear legs 46, 50 may include one or more second cross-members 54 extending therebetween. Such one or more first and second cross-members 52, 54 may stabilize and strengthen the legs and weight of the main body 22. The one or more second cross-members 54 may include a gas tank holder 56 coupled thereto such that a gas tank (not shown) may be positioned on the gas tank holder 56 and be readily coupled to the gas line 40. Furthermore, one or more first and second cross-members 52, 54 may serve to hold and receive a lower shelf 58. Such lower shelf 58 may be employed for storing or maintaining various cooking items and/or utensils or the like or anything desired by the user. Each of the legs may include wheels, such as two caster wheels 59 and two fixed wheels 61, positioned at or adjacent to a lower end of each of the legs. For example, the second front and rear legs 46, 50 may include the caster wheels 59 and the first front and rear legs 44, 48 may include the fixed wheels 61. In another embodiment, only one of the first front and rear legs 44, 48 or second front and rear legs 46, 50 includes either the caster wheels or fixed wheels. In another embodiment, the cooking station 10 may include at least two wheels 59 coupled to a base of the frame structure 24 of the cooking station 10. In this manner, the cooking station 10 may be readily moveable to a desired location, thereby, providing portability to the cooking station 10 as well as being readily employable for outdoor use at most any desired suitable location.

In one embodiment, the cooking station 10 may be of the type that can receive a griddle 60. The griddle 60 may include a flat cooking surface 62 with upstanding walls 64 that may extend above and along at least a portion of a periphery 66 of the flat cooking surface 62. In one embodiment, the griddle 60 may include a trough 68 sized and configured to facilitate draining grease or unwanted food by-product from the flat cooking surface 62. In one embodiment, the trough 68 may extend along a front periphery 70 of the flat cooking surface 62 that may extend to an open end 72 at or adjacent to the front and first sides 14, 18 of the cooking station 10. The other end of the trough 68 may be closed or blocked so that grease may only funnel toward the open end 72. The cooking station 10 may also include a grease catcher 74. Such great catcher 70 may include a container portion 76 and a latch portion 78 that may be latched over one of the upstanding side walls 64 of the griddle 60 such that the container portion 76 of the grease catcher 74 may be positioned below the open end 72 of the trough 68. In this manner, grease or food by-product may drain into the container portion 76 of the grease catcher 74 and, later, the grease catcher 74 may be readily removed from the griddle 60 for removing any food by-product therein. In another embodiment, the cooking station 10 may include a griddle of the type disclosed in commonly assigned U.S. Non-Provisional patent application Ser. No. 15/582,675, the disclosure of which is incorporated herewith in its entirety. In another embodiment, the side shelf system 12 depicted herein may be incorporated with other types of cooking stations, such as gas heated grills, charcoal heated cooking stations, pellet heated cooking stations or any other suitable outdoor portable cooking stations.

Now with reference to FIGS. 1, 2, 3 and 3A, in another embodiment, the cooking station 10 may include a first side shelf 80 and a second side shelf 82. The first and second side shelves 80, 82 may be removably secured to the respective first and second sides 18, 20 of the cooking station 10. In another embodiment, the first and second side shelves 80, 82 may be removably secured adjacent a lower end 84 of the first and second walls 30, 32 of the main body 22 such that the first and second side shelves 80, 82 may extend from the cooking station 10 at a level lower than the cooking surface 62 of the cooking station 10 or even at a level lower than the burners 35 (FIG. 2) within the cooking station 10. For example, in one embodiment, the first side shelf 80 may include one or more frame extensions, such as a first extension 86 and a second extension 88, each of which may extend from an inner side 90 of the first side shelf 80. The first and second extensions 86, 88 may be sized and configured to be coupled to the frame structure 24 or a portion of the frame structure 24 of the main body 22. For example, the frame structure 24 may include a first sleeve 92 and a second sleeve 94 with respective ends positioned adjacent the lower end 84 of the first side wall 80. Such first and second sleeves 92, 94 may be sized and configured to receive the respective first and second extensions 86, 88. Upon inserting the first and second extensions 86, 88 into the respective first and second sleeves 92, 94, a securement device 96 may be, for example, rotated to readily tighten and secure the first side shelf 80 to the frame structure 24. Similarly, the first side shelf 80 may be readily removed from the frame structure 24 by loosening the securement device 96. In this manner, the first and second side shelves 80, 82 may be readily removed, replaced and/or upgraded.

As previously set forth, the cooking station 10 includes the side shelf system 12. The side shelf system 12 may be incorporated in one or both of the first and second side shelves 80, 82 or, as depicted, in the first side shelf 80. In one embodiment, the side shelf system 12 may include the first side shelf 80 and at least one of a food pan 100, a cutting board 102, a holder device 104, and hooks 106 (FIG. 4). The first side shelf 80 may include an upper surface 110 defining an opening 112 therein. The upper surface 110 may be a substantially flat surface and may be employed as a work surface for assisting in the preparing of food to be cooked. The opening 112 defined in the upper surface 110 may be sized and configured to receive and hold the food pan 100 and/or the cutting board 102. The upper surface 110 may extend to a periphery 114 having a rectangular shape with peripheral side walls 116 or panels extending downward from the periphery 114 of the upper surface 110 of the first side shelf 80.

With respect to FIGS. 3 and 3A, as set forth, the upper surface 110 of the first side shelf 80 defines the opening 112 therein. The structure defining such opening 112 may be rectangular in shape or a rectangular periphery. In one embodiment, each side of such rectangular periphery may include an extension 120 that may extend downward from the sides of the rectangular periphery. Further, each extension 120 may include a ledge 122 that extends inward from a lower end 124 of the extension 120 to define a depth 126. The depth 126 may define a distance or length from the ledge 122 to the upper surface 110 of the first side shelf 80. Such depth 126 may substantially correspond with a thickness 128 of a lip 130 of the food pan 100 and/or a cutting board thickness 132. In this manner, upon positioning the food pan 100 and the cutting board 102 into the opening 112, a first surface or upward facing surface 134 of the cutting board 102 may be generally or substantially flush with the upper surface 110 of the first side shelf 80.

In another embodiment, as depicted in FIGS. 3B and 4, the first side shelf 80 may include a variation of the ledges extending from extensions. In this embodiment, two of the extensions 120 extending from the opening 112 defined in the upper surface 110 of the first side shelf 80 may not include ledges, but only a downward extending extension 120. Such two extensions may extend from opposite sides of the opening 112 defined in the upper surface 110 of the first side shelf 80. Further, two of the extensions 120 may include a ledge 123. The two extensions 120 with the ledge 123 in this embodiment may extend from opposing sides of the rectangular shaped opening 112 defined in the first side shelf 80 such that each ledge 123 may extend toward each other. The extensions 120 without the ledge 123 may extend downward so as to substantially prevent lateral movement of the food pan 100 and/or the cutting board 102 (see FIG. 2) positioned on the opposing extending ledges 123.

With reference back to FIGS. 1 and 3, as previously set forth, the opening 112 defined in the first side shelf 80 may be sized and configured to receive the food pan 100. The food pan 100 may include a basin portion 136 with four upstanding side walls 138 that extend from a bottom wall 140. The upstanding side walls 138 extend upward to the before-described lip 130. The lip 130 may extend outward and/or transverse relative to the upstanding side walls such that the lip 130 may extend continuously along an upper periphery 142 of the food pan 100. In one embodiment, the lip 130 may extend outward or orthogonal relative to the upstanding side walls 138 of the food pan 100. The lip 130 may extend outward so that an underside surface of the lip 130 may be positioned on an upper surface 144 of the ledge 122 extending from the extensions 120 of the first side shelf 80 and so that the basin portion 136 of the food pan 100 may be suspended below the ledge 122.

In one embodiment, the food pan 100 may be made of a stainless steel material, or any other suitable metallic material. In another embodiment, the food pan 100 may be made of a polymeric material. In another embodiment, the food pan 100 may include a height 146 or depth of about 70 millimeters or about 2.8 inches or in the range of about 2.5 inches to 3 inches. In another embodiment, the height 146 of the food pan 100 may be in the range of about 2 inches to 6 inches. In another embodiment, the food pan 100 may include a length 148 of about 320 millimeters or about 12.6 inches or in the range of about 10 inches to 14 inches or larger. In another embodiment, the food pan 100 may include a width 150 of about 220 millimeters or about 8.6 inches or in the range of about 6 inches to 10 inches.

Further, upon the food pan 100 being positioned over the ledge 122, the cutting board 102 may be positioned within the opening 112 defined in the first side shelf 80 such that the upward facing surface 134 is substantially flush with the upper surface 110 of the first side shelf 80, as previously set forth. In one embodiment, the cutting board 102 may be made of a wood material, such as bamboo or any other suitable cutting board wood material. In another embodiment, the cutting board 102 may be made of a suitable polymeric material, such as plastic. The cutting board 102 may include substantially similar sizing as the length and width dimensions of the food pan 100. The cutting board 102 may include the upward facing surface 134 and a downward facing surface 152, both of which may be interchangeable, depending upon how the user positions the cutting board 102 into the opening 112 of the first side shelf 80. Further, the cutting board 102 may include a peripheral side 154 defining a depth or cutting board thickness 132 of the cutting board 102. As previously set forth, the depth may be sized so that the upward facing surface 134 sits flush relative to the upper surface 110 of the first side shelf 80.

The cutting board 102 may include a cutting board opening 156 defined therein. Such cutting board opening 156 may be positioned adjacent the periphery or one side of the cutting board 102 and extend completely through the cutting board 102 as a through hole. The cutting board opening 156 may be elongated and sized so that a user can readily grasp the cutting board 102 to remove or slightly lift the cutting board 102 from the opening 112 of the first side shelf 80 to access the food pan 100 or to readily remove the cutting board 102 for, for example, cleaning purposes. In this manner, a user may utilize the upward facing surface 134 of the cutting board 102 for preparing food or for any purpose desired by the user and the food pan 100 may be employed for placing cooked food or non-cooked food. Further, the cutting board opening 156 may be sized so that food or waste may be pushed or slid through the cutting board opening 156.

Figure 5:
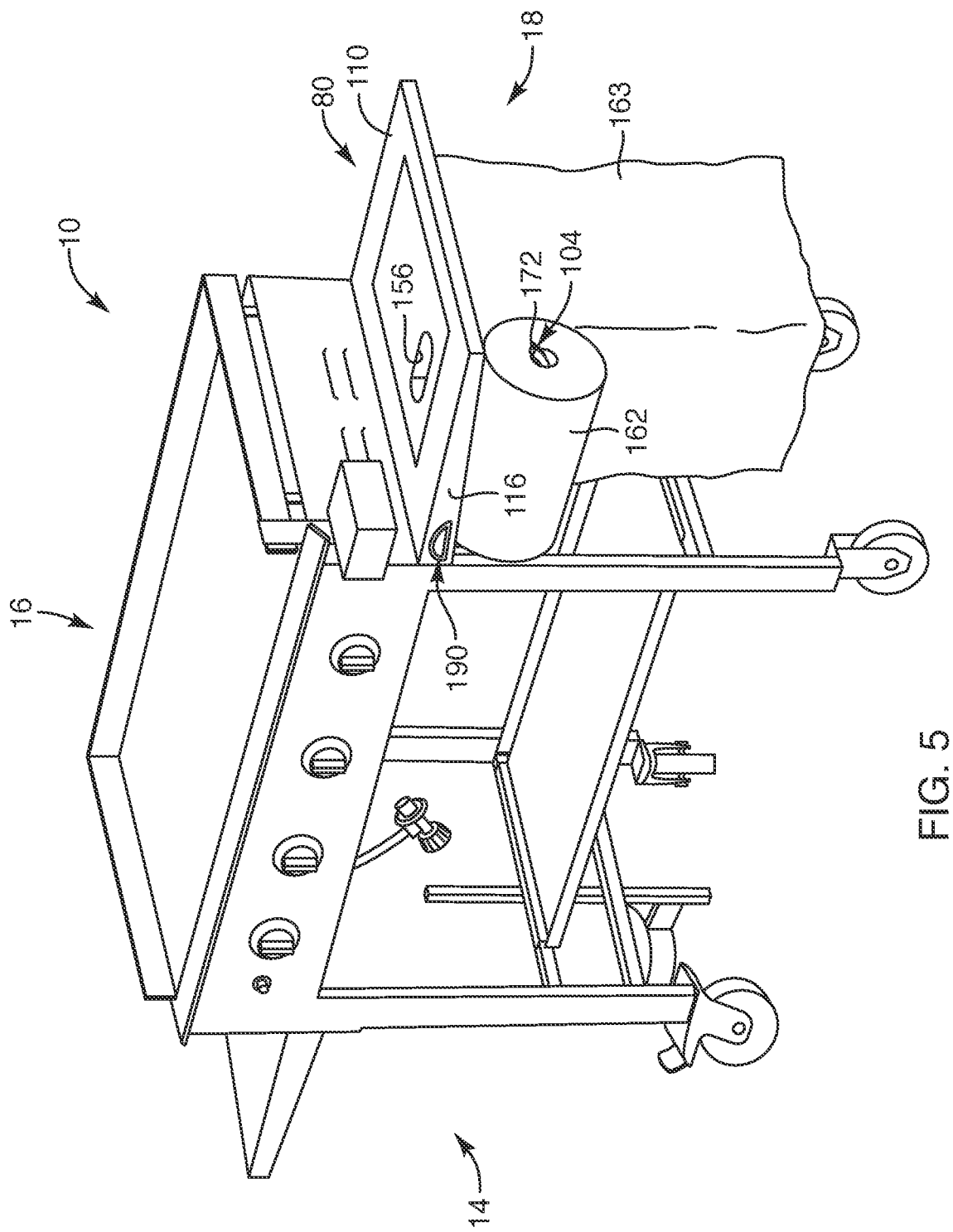
FIG. 5 is a perspective view of the portable outdoor cooking station and a side shelf system, according to another embodiment of the present invention.

With respect to FIGS. 3 and 5, as previously set forth, the first side shelf 80 may also include a holder device 104. The holder device 104 may be sized and configured to receive, for example, a single paper towel roll 162 or for hanging cloth towels or the like over a portion of the holder device 104. In one embodiment, the holder device 104 may be coupled to an underside of the first side shelf 80 and along or adjacent a front side 14 of the first side shelf 80 of the cooking station 10. The holder device 104 may be L-shaped with a first extension 164 and a second extension 166 each of which may be elongated portions and a single piece structure. The first extension 164 may include a length that is shorter than the second extension 166. The first extension 164 may include coupling structure (not shown) for coupling to the underside of the first side shelf 80 such that the first extension 164 may extend downward from the first side shelf 80. The second extension 166 may extend from an end of the first extension 164 and may extend substantially perpendicular or transverse relative to the first extension 164 such that the second extension 166 may extend substantially horizontal or parallel relative to the upper surface 110 of the first side shelf 80. The second extension 166 may include a first bend 168 adjacent to a free end 172 of the second extension 166 such that the first bend 168 extends upward. The first and second extensions 164, 166 may be a single piece structure with a second bend 170 defining the juncture between the first and second extensions 164, 166. In this manner, the holder device 104 may extend under the first side shelf 80 so that the holder device 104 does not take away space from the upper surface 110 of the first side shelf 80 while also being at a convenient location as the user is cooking or cleaning the cooking station 10 or other articles. In another embodiment, the holder device 104 may be coupled to the frame structure 24 of the cooking station 10.

In another embodiment, the holder device 104 may be operatively coupled to the frame structure 24 of the cooking station 10. In another embodiment, the holder device 104 may be fixedly coupled (meaning coupled to the first side shelf 80 or the frame structure 24 of the cooking station 10) so as to extend below the first side shelf 80 in a generally horizontal manner relative to the upper surface 110 of the first side shelf 80. In another embodiment, the holder device 104 may be in the form of, for example, a cable with latches on ends of the cable to couple at two separate positions on the first side shelf such that the cable is sized to hold, for example, a paper towel roll.

With reference to FIGS. 4 and 5, in another embodiment, the cooking station 10 may include multiple hooks 106, FIG. 4 not showing the holder device 104 for simplistic purposes. The first side shelf 80 may include the multiple hooks 106, such as a first hook 174, a second hook 176, a third hook 178, and a fourth hook 180. The multiple hooks 106 may be coupled to a portion of the first and second extensions 86, 88 of the first side shelf 80. The hooks 106 may be sized and configured to be attached to, latch, or hang a garbage bag 163, such as a plastic garbage bag. The hooks 106 may be coupled, for example, adjacent to and below corners of the opening 112 defined in the upper surface 110 of the first side shelf 80 or adjacent to the ledge 122, 123. The hooks 106 may include various structures for clipping, latching, grasping or hanging an article, such as a waste or garbage bag 163. For example, the hooks 106 may be in the form of a J-hook so as to exhibit a J-shaped configuration. In one embodiment, the hooks 106 may define a downward extension 182, a base 184, and an upward extension 186, the downward extension 182 being longer than the upward extension 186. The downward extension 182 of each of the hooks 106 may be coupled to the framework or a portion of one of the first and second extensions 86, 88 of the first side shelf 80. The base 184 may extend inward from the downward extension 182 and the upward extension 186 extends upward from one end of the base 184 to a free end 188.

Each of the hooks 106 having the J-shaped configuration may be mounted to an underside of the first side shelf 80 so as to be positionably arranged to hold, for example, a waste bag directly under the cutting board 102 such that each one of the hooks 106 may face or extend outward relative to an oppositely positioned hook 106. For example, the first hook 174 may extend outward and face toward the front side and the third hook 178 may extend outward and face toward the rear side of the first side shelf 80 such that oppositely positioned hooks 106 face opposite directions. Similarly, the second hook 180 may extend outward and face toward the front side of the first side shelf 80 and the fourth hook 180 may extend outward and face toward the rear side of the first side shelf 80. In another embodiment, oppositely positioned hooks 106 having the J-shaped configuration may face or extend toward each other. Upon positioning and attaching, for example, a plastic garbage bag 163 on the hooks 106, a user may readily lift or remove the cutting board 102 and drop waste into the garbage bag 163 or the user may slide or push waste through the cutting board opening 156 to drop waste into the garbage bag 163. In this embodiment, the user may not position the food pan 100 onto the ledges 123 of the first side shelf 80.

With reference to FIGS. 1, 4, and 5, in another embodiment, the user may include the food pan 100 onto the ledges 122, 123 (see FIG. 3) with the cutting board 102 positioned over the food pan 100, and utilize only two of the hooks 106 of the first side shelf 80. For example, with the food pan 100 and cutting board 102 positioned within the first side shelf 80, the user may utilize the first hook 174 and the second hook 176 to hang a garbage bag so that the bag may be easily accessible along the front side 14 of the cooking station 10. Similarly, the user may also effectively utilize the first hook 174 and the third hook 178 so that the bag may be accessible along the first side 18 of the cooking station 10. In this manner, the hooks 106 may be utilized while also maintaining the benefits of the food pan 100 and the cutting board 102 of the side shelf system 12.

In another embodiment, the side shelf system 12 may include a bottle opener device 190. The bottle opener device 190 may be coupled to the first side shelf 80. In one embodiment, the bottle opener device 190 may be fixed to the peripheral side wall 116, such as a front peripheral side wall, of the first side shelf 80. In another embodiment, the bottle opener device 190 may be operatively coupled to the first side shelf 80 so as to be coupled to a line that may hang from the first side shelf 80.

Figure 6:
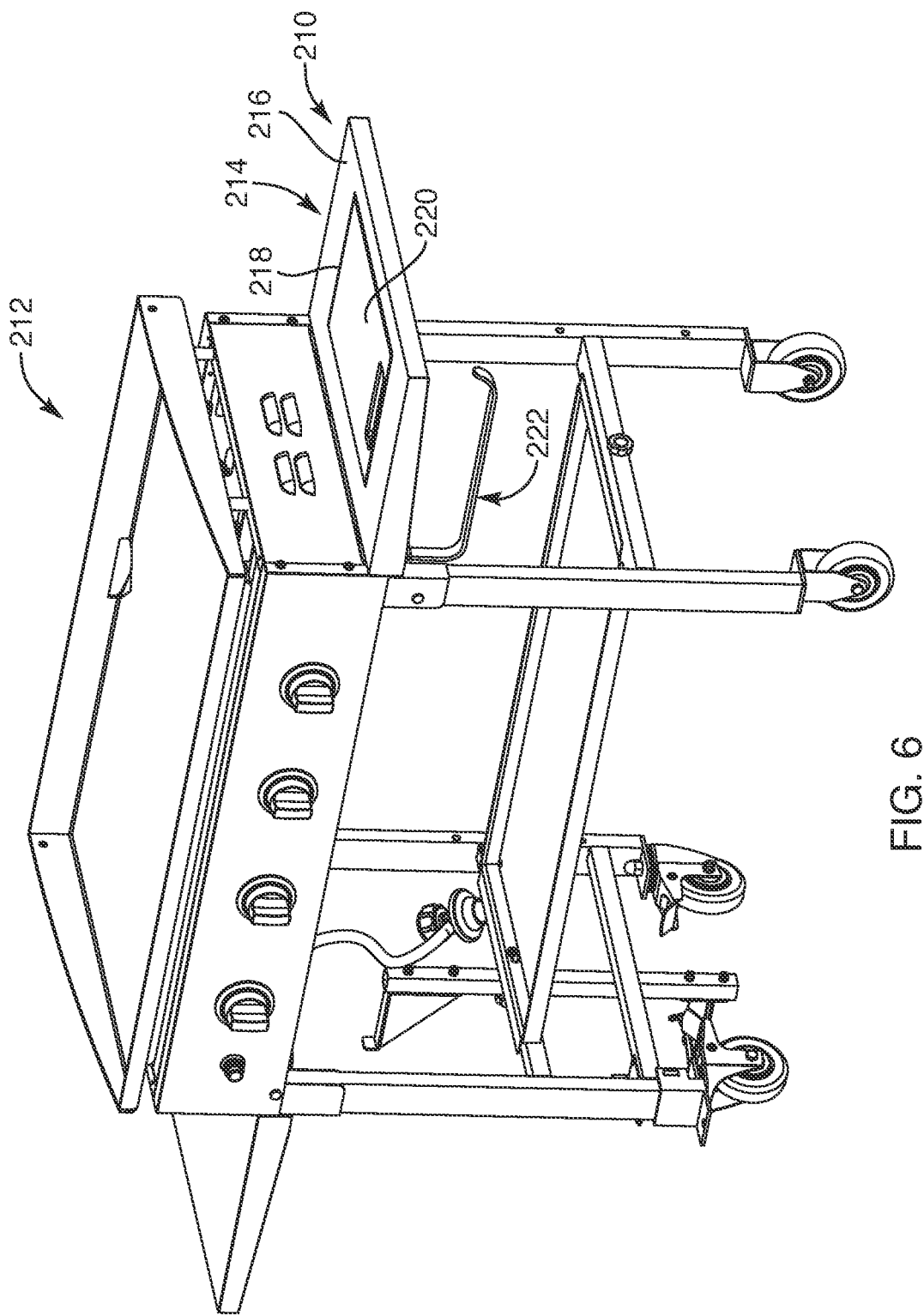
FIG. 6 is a perspective view of another embodiment of a portable outdoor cooking station and a side shelf system, according to the present invention.
Figure 7A:
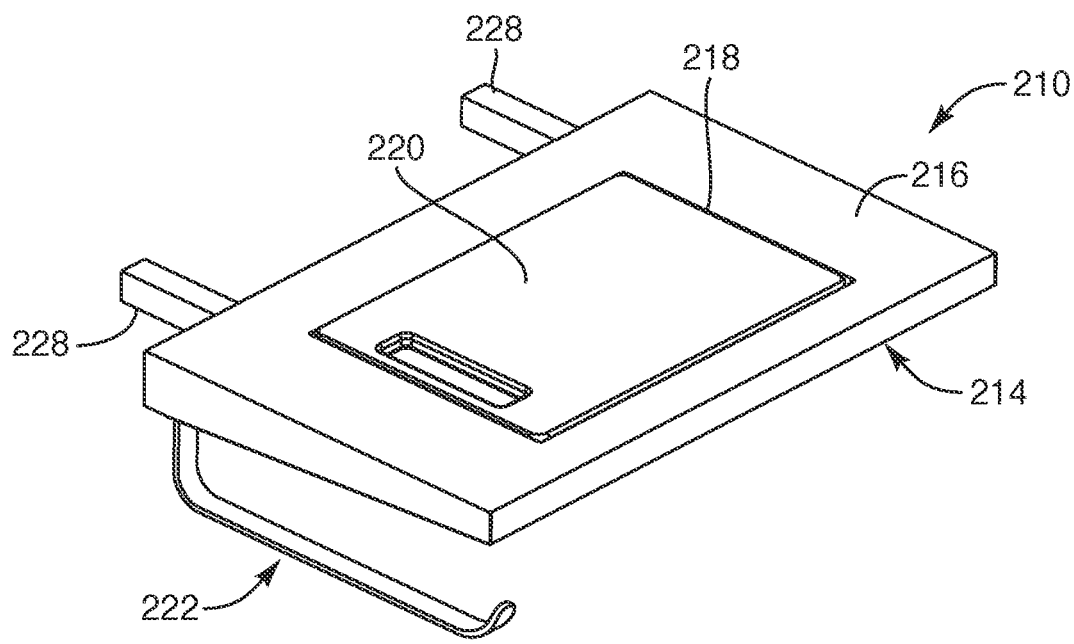
FIG. 7A is a perspective top view of the side shelf system of FIG. 6, according to another embodiment of the present invention.
Figure 7B:
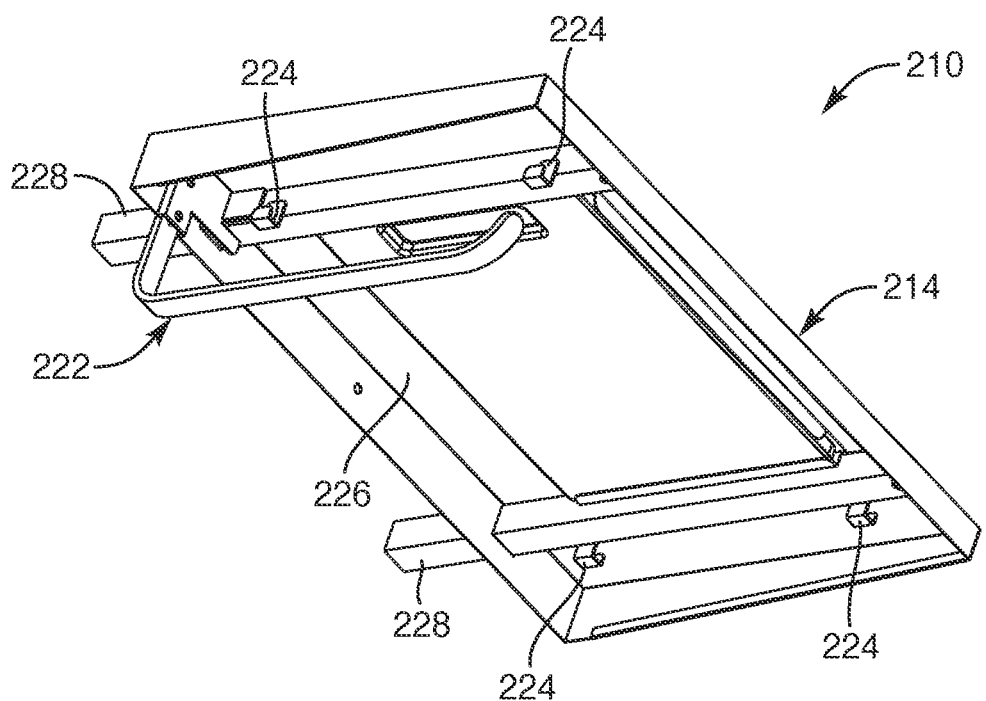
FIG. 7B is a perspective bottom view of the side shelf system of FIG. 6, according to another embodiment of the present invention.

Now with reference to FIGS. 6, 7A, and 7B, another embodiment of side shelf system 210 secured to a cooking station 212 is provided. This embodiment of the side shelf system 210 may include similar structural features as that described and depicted relative to the side shelf system 12 of FIGS. 1 and 3, except in this embodiment the side shelf system 210 of the cooking station 212 may not include a food pan employed therewith. Similar to previous embodiments, the side shelf system 210 of this embodiment may include a side shelf 214 with an upper surface 216, the upper surface 216 defining an opening 218 therein. Such opening 218 may be sized and configured to receive a cutting board 220, the cutting board 220 being readily removable from the opening 218. Further, the side shelf system 210 may include a holder device 222 sized and configured to hold, for example, a paper towel roll, or for hanging cloth towels or for hanging cooking utensils or the like thereon. In another embodiment, the side shelf system may include various hooks 224 positioned and mounted to an underside 226 of the side shelf 214. Such hooks 224 may be sized and configured for hanging a waste bag, for example, such that the waste bag may be positioned directly under the cutting board 220. Further, as in previous embodiments, the side shelf may be removably coupled to frame components of the cooking station 212. For example, sleeve extensions 228 may extend from one side of the side shelf to couple to the frame components of the cooking station 212.

Figure 8:
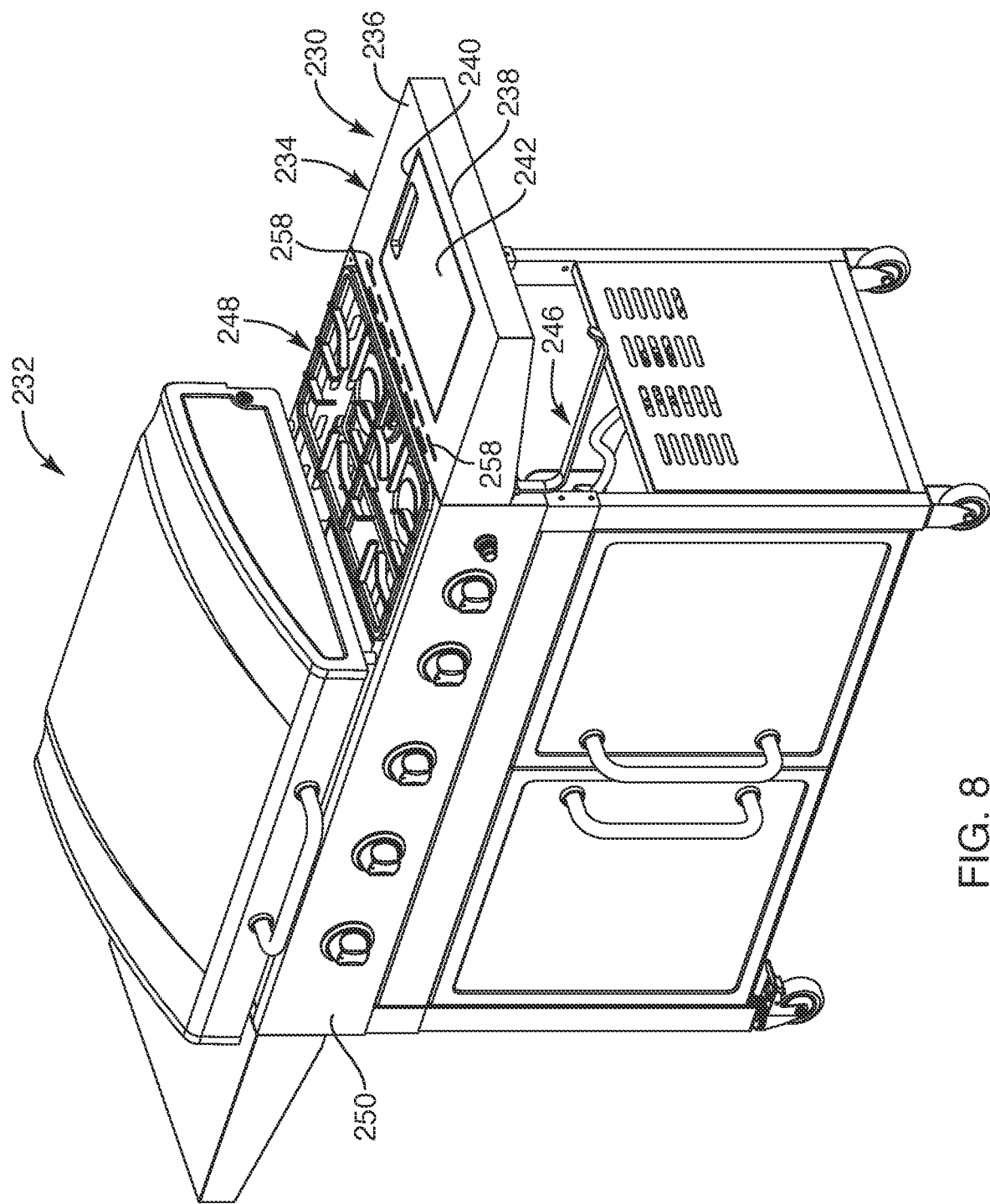
FIG. 8 is a perspective view of another embodiment of a portable outdoor cooking station and a side shelf system, according to the present invention.
Figure 9A:
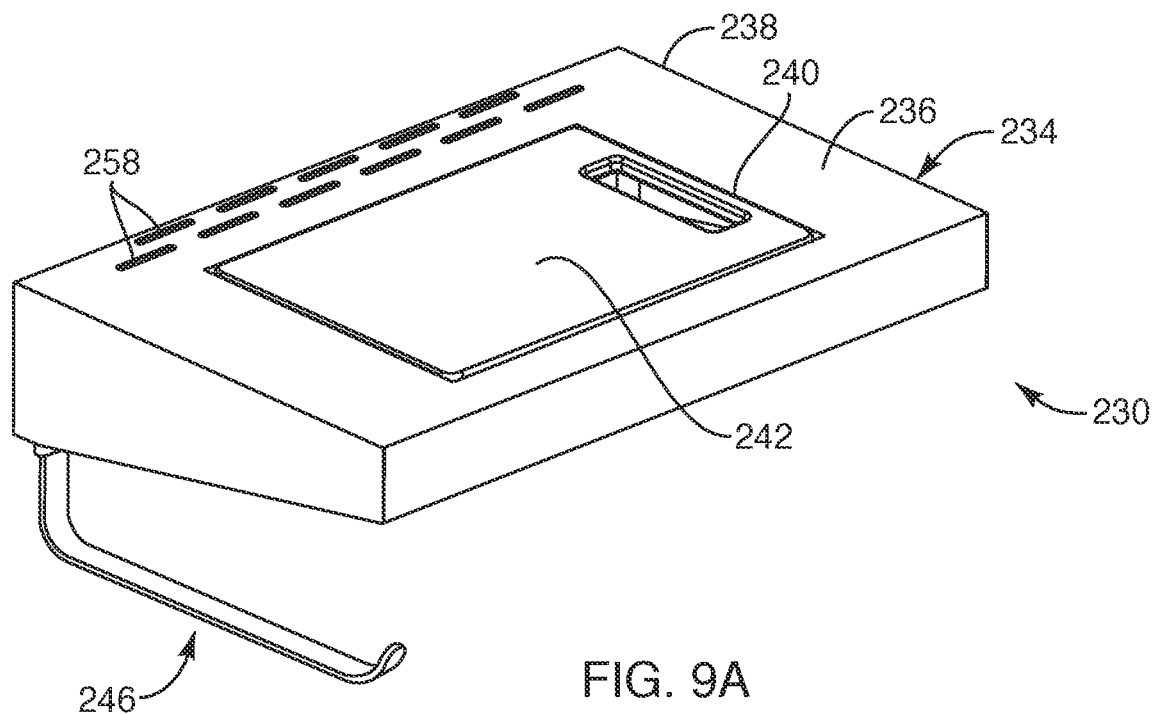
FIG. 9A is a perspective top view of the side shelf system of FIG. 8, according to another embodiment of the present invention.
Figure 9B:
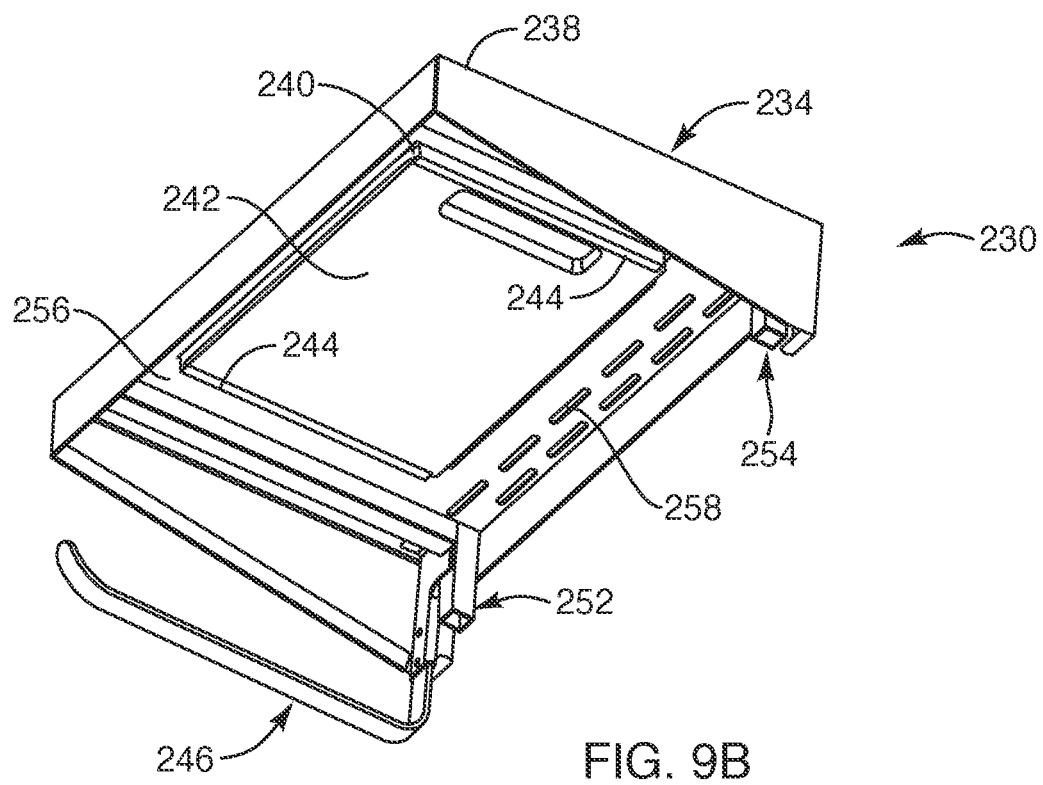
FIG. 9B is a perspective bottom view of the side shelf system of FIG. 8, according to another embodiment of the present invention.

Now with reference to FIGS. 8, 9A, and 9B, another embodiment of a side shelf system 230 sized and configured to be coupled to a portable outdoor cooking station 232 is provided. This embodiment of the side shelf system 230 may include similar structural features of previous embodiments of the side shelf system (see FIGS. 1 and 3). For example, similar to previous embodiments, the side shelf system 230 may include a side shelf 234 with an upper surface 236 extending to define a periphery 238. The upper surface 236 of the side shelf 234 may define an opening 240 therein sized and configured to removably receive a cutting board 242. Such cutting board 242 may sit over ledges 244 extending laterally inward from the opening 240 such that an upper surface of the cutting board 242 may be somewhat flush or level with the upper surface 236 of the side shelf 234. Further, the side shelf system 230 may include a holder device 246 sized and configured to hold a paper towel roll or any other suitable utensil or cleaning device.

In this embodiment, the side shelf system 230 may be coupled to the cooking station 232 such that the upper surface 236 of the side shelf 234 may be positioned somewhat level with burner structure 248 of the cooking station 232 or level with an upper end of a front panel 250 of the cooking station 232. The side shelf system 230 may include a first coupling extension 252 and a second coupling extension 254, each of which may be sized and configured to couple to frame structure of the cooking station 232. For example, the first and second coupling extensions 252, 254 of this embodiment may extend downward from an underside 256 of the side shelf 234 and adjacent one side of the side shelf 234 in a direction perpendicular relative to the upper surface 236 of the side shelf 234. Such first and second coupling extensions 252, 254 may be coupled to corresponding frame structure of the cooking station 232 and may be in the form of sleeve structure, for example. Further, in this embodiment, the upper surface 236 may define venting structure 258 in the form of slots or narrow openings extending along one side of the upper surface 236 adjacent the burner structure 248 of the cooking station 232.

Figure 10:
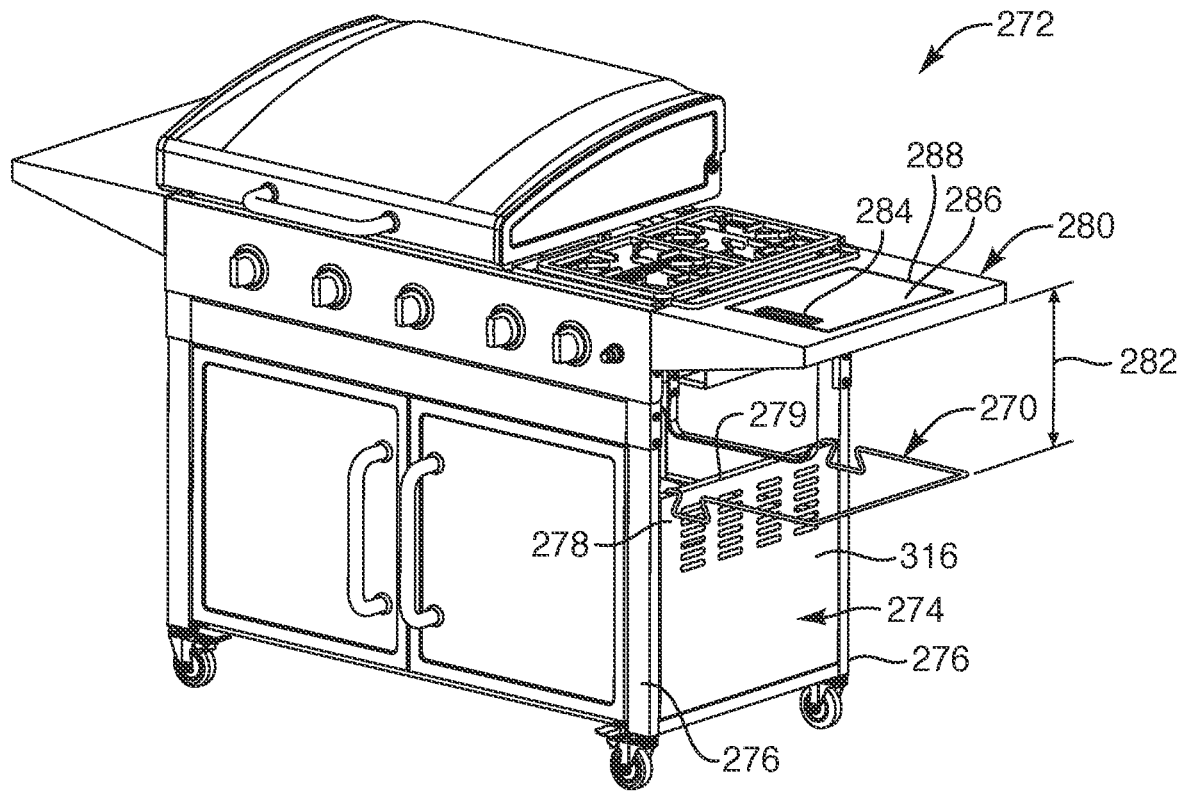
FIG. 10 is a perspective view of another embodiment of an outdoor cooking station, depicting a waste bag holder positioned over a vertical side panel of the cooking station, according to the present invention.
Figure 11:
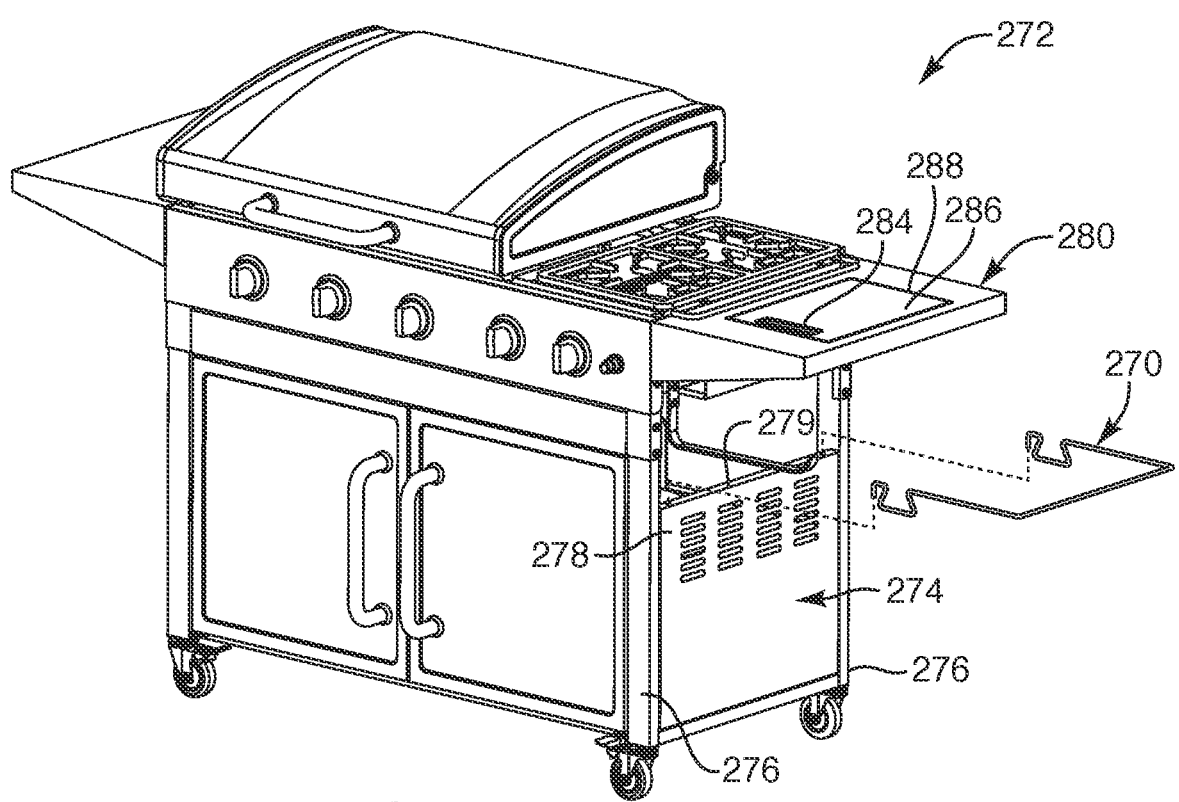
FIG. 11 is a perspective view of the outdoor cooking station of FIG. 10, depicting the waste bag holder removed from the vertical side panel of the cooking station, according to another embodiment of the present invention.

With reference to FIGS. 10 and 11, in another embodiment, an outdoor cooking station 272 similar to FIG. 8, may include another version of a waste bag holder 270. For example, the cooking station 272 may include a vertical side panel 274 that may be positioned between two side legs 276 of the cooking station 272. The waste bag holder 270 may be sized and configured to be suspended over a top portion 278 and top edge 279 of the vertical side panel 274. Further, such waste bag holder 270 may be positioned over the vertical side panel 274 so that the waste bag holder 270 extends outward and below a side shelf 280 coupled to the outdoor cooking station 272. The side shelf 280 with a cutting board 286 disposed therein, as previously set forth in previous embodiments, may be positioned a distance 282 above the waste bag holder 270. Upon positioning a waste bag (not shown) over a portion of the waste bag holder 270, food product waste or other waste may be dropped through a throughhole 284 defined in the cutting board 286 or through an opening 288 defined in the side shelf 280 (upon removing the cutting board). Further, with the waste bag holder 270 positioned the distance 282 below the side shelf 280, the distance 282 between an underside of the side shelf 280 and the waste bag and waste bag holder 270 facilitates ready access to drop waste from one of the sides surrounding the waste bag and waste bag holder 270. In this manner, waste may readily be disposed of while cooking with the side shelf system while substantially blocking viewability of the waste at the cooking station 272. Further, as depicted in FIG. 10, the waste bag holder 270 may be employed with the side shelf system, described in previous embodiments, or the waste bag holder 270 may be employed with any suitable vertically oriented panel, without the side shelf system previously described.

Figure 12:
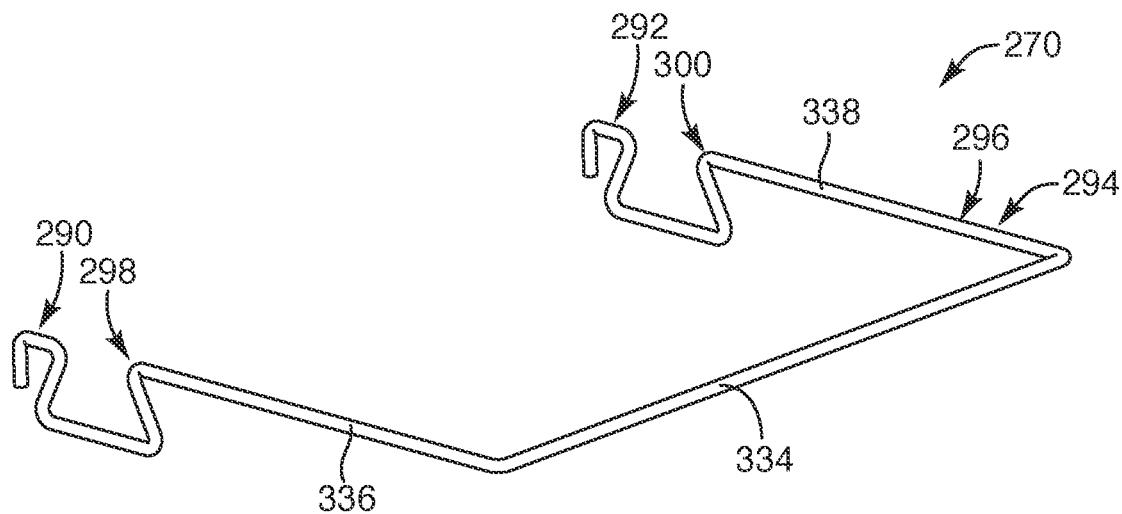
FIG. 12 is a perspective view of the waste bag holder, according to another embodiment of the present invention.

With reference to FIGS. 10 and 12, the waste bag holder 270 may be sized and configured to be vertically aligned with the side shelf 280 such that, upon positioning a waste bag over the waste bag holder 270, the waste bag holder 270 may hold the waste bag in an opened spread-out state to be disposed directly below the side shelf 280 with the distance 282 therebetween. In one embodiment, the waste bag holder 270 may be sized and configured to be manually positioned over the vertical side panel 274. In another embodiment, the waste bag holder 270 may be sized and configured to be readily removable so as to be manually lifted up and removed from the vertical side panel 274.

In one embodiment, the waste bag holder 270 may extend with a single rod structure. The single structure may be made from an elongated rod-like structure with multiple bends along an elongated length of the rod-like structure. In another embodiment, the single rod structure may be a unitary, seamless, and monolithic structure. In another embodiment, the single rod structure may be employed without any other additional components attached thereto, except for a waste bag.

The waste bag holder 270 may include first and second engaging portions 290, 292 each extending to a holding portion 294, the first and second engaging portions 290, 292 being spaced apart from each other. Such spaced distance between the first and second engaging portions 290, 292 may be less than a distance between the legs 276 of the cooking station 272 so as to readily be positioned over the vertical side panel 274. The holding portion 294 may extend with a u-shaped structure 296 with ends defining and extending to first and second corner portions 298, 300, each of the first and second corner portions 298, 300 interconnected to and extending from the respective first and second engaging portions 290, 292. Such first and second engaging portions 290, 292 may each extend with a hook like configuration sized and configured to be positioned over the vertical side panel 274.

Figure 13:
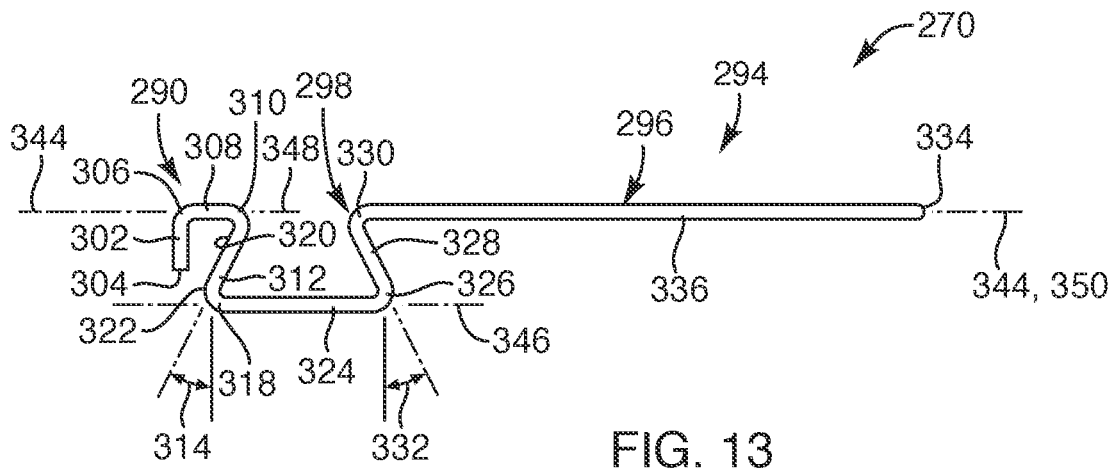
FIG. 13 is a left side view of the waste bag holder, according to the present invention.
Figure 14:
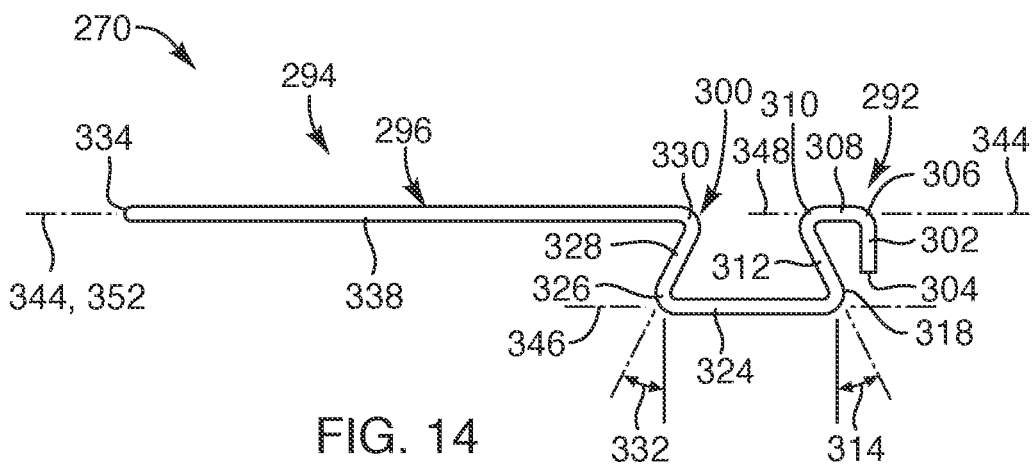
FIG. 14 is a right side view of the waste bag holder, according to the present invention.
Figure 15:
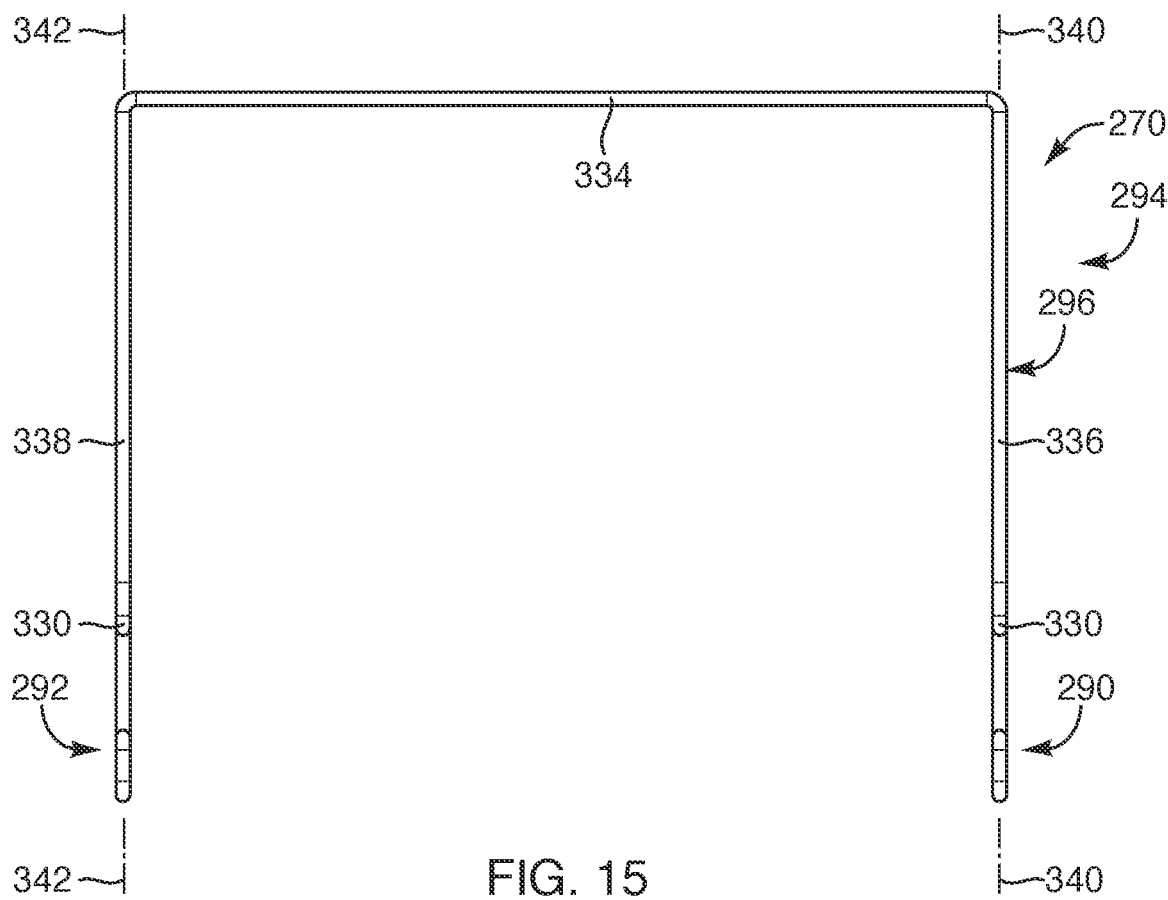
FIG. 15 is a top side view of the waste bag holder, according to the present invention.
Figure 16:
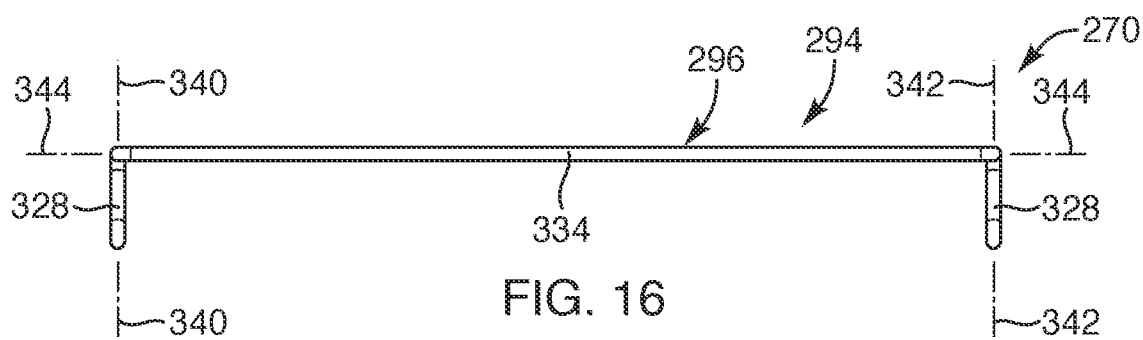
FIG. 16 is a front side view of the waste bag holder, according to the present invention.
Figure 17:
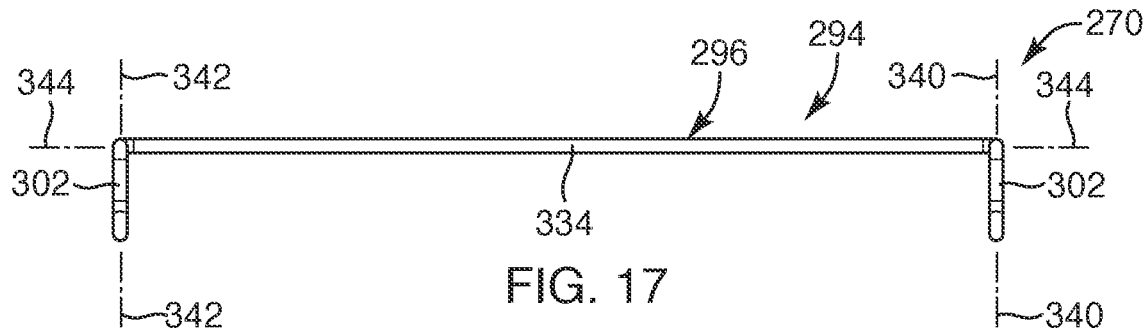
FIG. 17 is a rear side view of the waste bag holder, according to the present invention.

For example, with reference to FIGS. 12-14, the first and second engaging portions 290, 292 of the rod structure may each include a single back extension 302 with a free end 304, the back extension 302 configured to extend along a back side of the vertical side panel 274 (FIG. 10). In other words, the first and second engaging portions 290, 292 each only exhibits one portion, the back extension 302, extending linearly (without bends) along the back side of the vertical side panel 274. The back extension 302 may extend from the free end 304 to a first bend 306 to then extend and define a top extension 308, the top extension 308 extending substantially orthogonal relative to the back extension 302. The top extension 308 may be configured to extend along the top edge 279 of the vertical side panel 274 (see FIG. 10). The top extension 308 may extend to a second bend 310 to then extend downward and inward (away from the u-shaped structure 296) to define a front extension 312. The front extension 312 may extend downwardly inward with a first angle 314 such that the front extension 312 may extend adjacently along a front side 316 of the top portion 278 of the vertical side panel 274. The first angle 314 may be an acute angle relative to the vertically extending back extension 302. The front extension 312 may extend to a third bend 318 such that a backside 320 of the front extension 312 may engage the front side 316 (FIG. 10) of the vertical side panel 274. In another embodiment, due to the first angle 314 of the front extension 312, the backside 320 of the front extension 312 that engages the vertical side panel 274 may be adjacent to or along a portion of the third bend 318 at an engagement point 322 or engagement portion. Such engagement point 322 of the front extension 312 of the first and second engaging portions 290, 292 may stabilize the waste bag holder 270 with the back and top extensions 302, 308 positioned over the vertical side panel 274. The third bend 318 defined in the first and second engaging portions 290, 292 may extend to define a lower extension 324, the lower extension 324 extending to a fourth bend 326. The lower extension 324 for each of the first and second engaging portions 290, 292 may be a transition member between first and second engaging portions 290, 292 and the holding portion 294.

As previously set forth, the holding portion 294 may include the first and second corner portions 298, 300 corresponding with the respective first and second engaging portions 290, 292 and ends of the u-shaped structure 296. For example, the lower extension 324 extends to the fourth bend 326, which extends to define a holding extension 328.

The holding extension 328 may extend between the fourth bend 326 and a fifth bend 330 such that the holding extension 328 may extend upward and inward at a second angle 332 to the fifth bend 330. The second angle 332 may extend at an acute angle relative to the vertical, such as the vertically extending back extension 302. At the fifth bend 330, the holding extension 328 extends to one of the ends of the u-shaped structure 296. Further, the fifth bend 330 and holding extension 328 of the holding portion 294 defines each of the first and second corner portions 298, 300. In this manner, the first and second corner portions 298, 300 extend to the respective ends of the u-shaped structure 296.

With reference to FIGS. 12-15, the u-shaped structure 296 of the holding portion 294 may include an outer extension 334 extending between first and second leg extensions 336, 338. Each of the first and second leg extensions 336, 338 extending directly from the respective first and second corner portions 298, 300 or the fifth bend 330. Further, the first and second leg extensions 336, 338 may extend substantially orthogonal relative to the outer extension 334. With this arrangement, the holding portion 294 defining the u-shaped structure 296 and the first and second corner portions 298, 300 may readily facilitate spreading and wrapping a waste bag (not shown) along an opening defined in an end portion of the waste bag (not shown) over the holding portion 294 of the waste bag holder 270.

As depicted in FIGS. 12-17, in one embodiment, portions of the first and second engaging portions 290, 292 may be aligned with portions of the holding portion 294. For example, the first engaging portion 290, in its entirety, may be aligned with the first leg extension 336 such that the first engaging portion 290 (with its various bends and extensions, such as the back extension 302, front extension 312, lower extension 324, and holding extension 328) and the first leg extension 336 extend within a first plane 340. Similarly, the second engaging portion 292, in its entirety, may be aligned with the second leg extension 338 such that the second engaging portion 292 and the second leg extension 338 extend within a second plane 342. Such first and second planes 340, 342, as previously defined, may extend substantially parallel relative to each other. Further, in another embodiment, the top extension 308 of both the first and second engaging portions 290, 292 and the u-shaped structure 296 of the holding portion 294 may extend within a third plane 344. The third plane 344 may extend substantially orthogonal relative to the first and second planes 340, 342. In this manner, the u-shaped structure 296 may be aligned level with the top extension 308 of the first and second engaging portions 290, 292.

Further, the lower extension 324 may define a longitudinal lower axis 346 along its length. The top extension 308 of the first and second engaging portions 290, 292 may extend longitudinally to define a top axis 348. The first and second leg extensions 336, 338 may each extend longitudinally to define first and second leg axes 350, 352. The lower axis 346 defined by the lower extension 324 may extend substantially parallel relative to the top axis 348 defined by the top extension 308 and the first and second leg axes 350, 352 defined by respective first and second leg extensions 336, 338. Further, the top axis 348 defined by the top extension may extend substantially coaxially relative to the first and second leg axes 350, 352 defined by the first and second leg extensions 336, 338. In another embodiment, the lower extension 324, the front extension 312 and the holding extension 328, may extend so as to exhibit a bottom half of a triangular configuration. In another embodiment, the first and second leg extensions 336, 338 may extend substantially parallel relative to each other. In another embodiment, the outer extension 334 of the u-shaped structure 296 may extend substantially orthogonal relative to the first and second leg extensions 336, 338. With this arrangement, portions of the first and second engaging portions 290, 292 may be aligned with portions of the holding portion 294. Further, such alignment and symmetrical characteristics of the waste bag holder 270 provides a low profile device with a minimized footprint. Such low profile and minimized footprint is advantageous as an accessory to an outdoor cooking station, especially when managing the cleanliness of the area in which the user is cooking with the outdoor cooking station.

Figure 18:
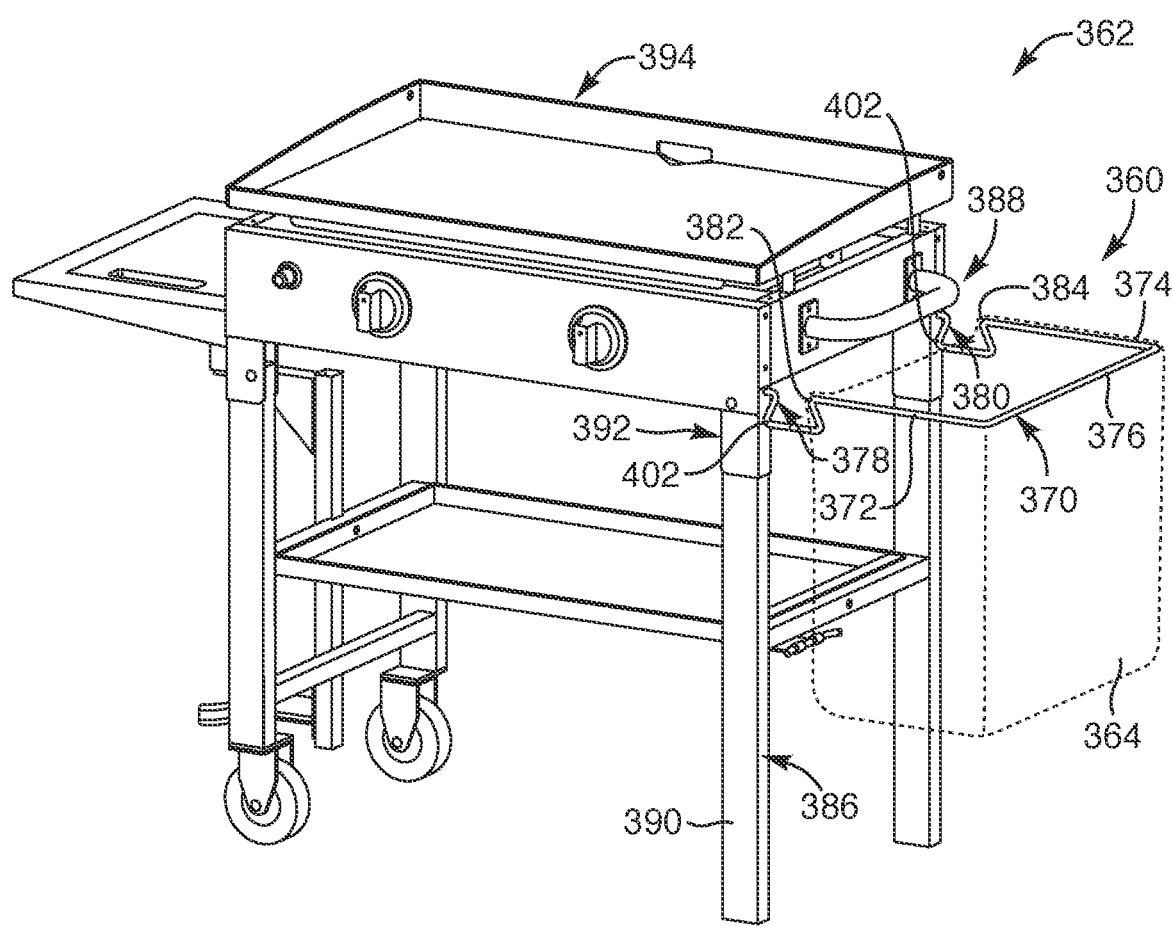
FIG. 18 is a perspective view of another embodiment of a waste bag holder coupled to a side surface of a cooking station, depicting a waste bag in outline form coupled to the waste bag holder, according to the present invention.
Figure 19:
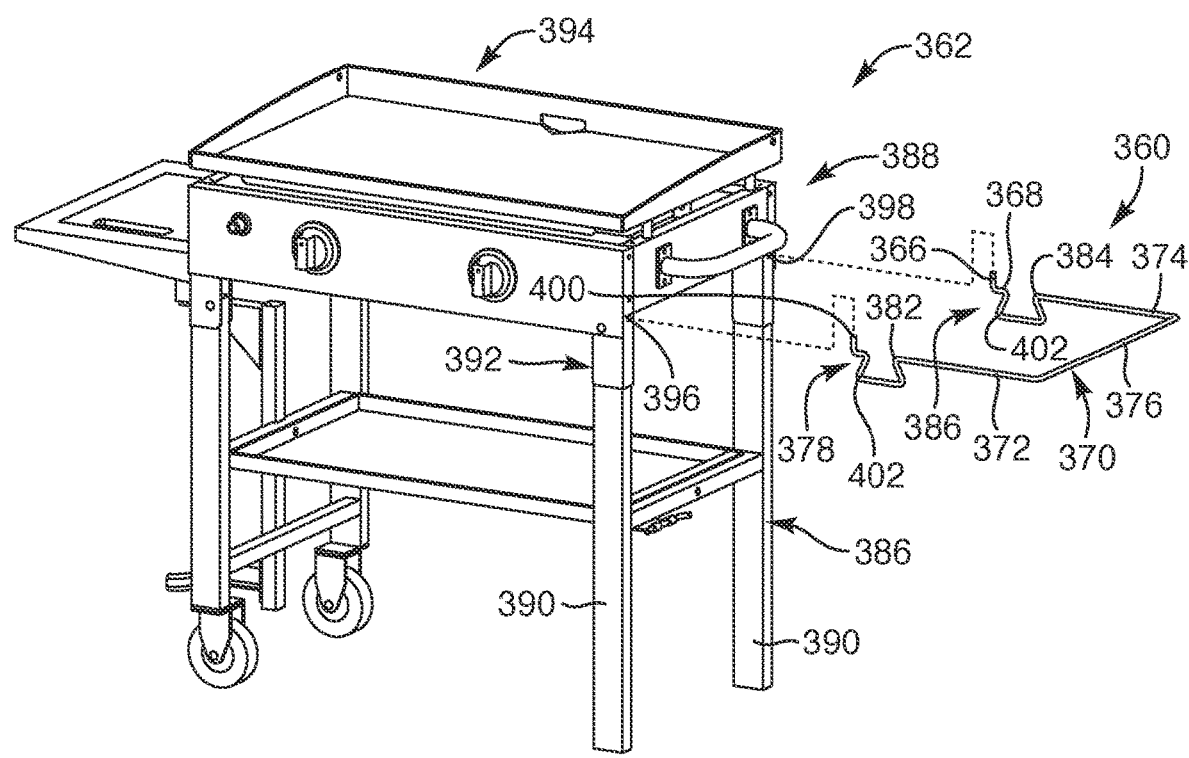
FIG. 19 is an exploded perspective view of the waste bag holder and the cooking station, depicting the waste bag holder in a non-engaged position and readily removable relative to the cooking station, according to another embodiment of the present invention.

Now with reference to FIGS. 18 and 19, another embodiment of a waste bag holder 360 is provided. The waste bag holder 360 may be sized and configured to be removably coupled to a cooking station 362 and is configured to hold a waste bag 364 (the waste bag shown in dashed lines in FIG. 18). This embodiment of the waste bag holder 360 includes similar structural characteristics as the previous embodiment, except a back extension 366 of this embodiment of the waste bag holder 360 may extend upward above a top extension 368 instead of downward, as in the previous embodiment. For example, the waste bag holder 360 of this embodiment may include a holding portion 370 extending with a u-shaped structure having first and second leg extensions 372, 374 and an outer extension 376 extending between ends of the first and second leg extensions 372, 374. Further, the waste bag holder 360 may include first and second engagement portions 378, 380 and first and second corner portions 382, 384. The first and second corner portions 382, 384 may be sized and configured to cooperate with the holding portion 370 for wrapping a peripheral opening of the waste bag 364 thereto. The first and second engagement portions 378, 380 may be sized and configured to couple to a side surface 386 of the cooking station 362, such as an upper portion 388 of legs 390 of a framework 392 of the cooking station 362 or within a portion of the framework 392 supporting the heating elements and, for example, a griddle 394 of the cooking station 362. The side surface 386 may define first and second apertures 396, 398 therein, the first and second apertures 396, 398 sized and configured to receive a free end 400 of the back extension 366 of the respective first and second engagement portions 378, 380. With this arrangement, the free ends 400 of the back extensions 366 may be inserted into respective first and second apertures 396, 398 so that the back extensions 366 may be positioned within a hollow portion of the framework 392 of the cooking station 362. As in the previous embodiment, the first and second engagement portions 378, 380 may each include structure for an engagement point 402. Such engagement point 402 of each of the first and second engagement portions 378, 380 may contact the side surface 386 of the cooking station 362 adjacently below the first and second apertures 396, 398. In this manner, cooperation of the back extensions 366 within the corresponding first and second apertures 396, 398 and the engagement point 402 of each of the first and second engagement portions 378, 380 of the waste bag holder 360 may facilitate suspending the waste bag holder 360 along one side of the cooking station 362 so that a waste bag 364 may be positioned around or over the holding portion 370 of the waste bag holder 360, similar to that described in the previous embodiments.

Figure 20:
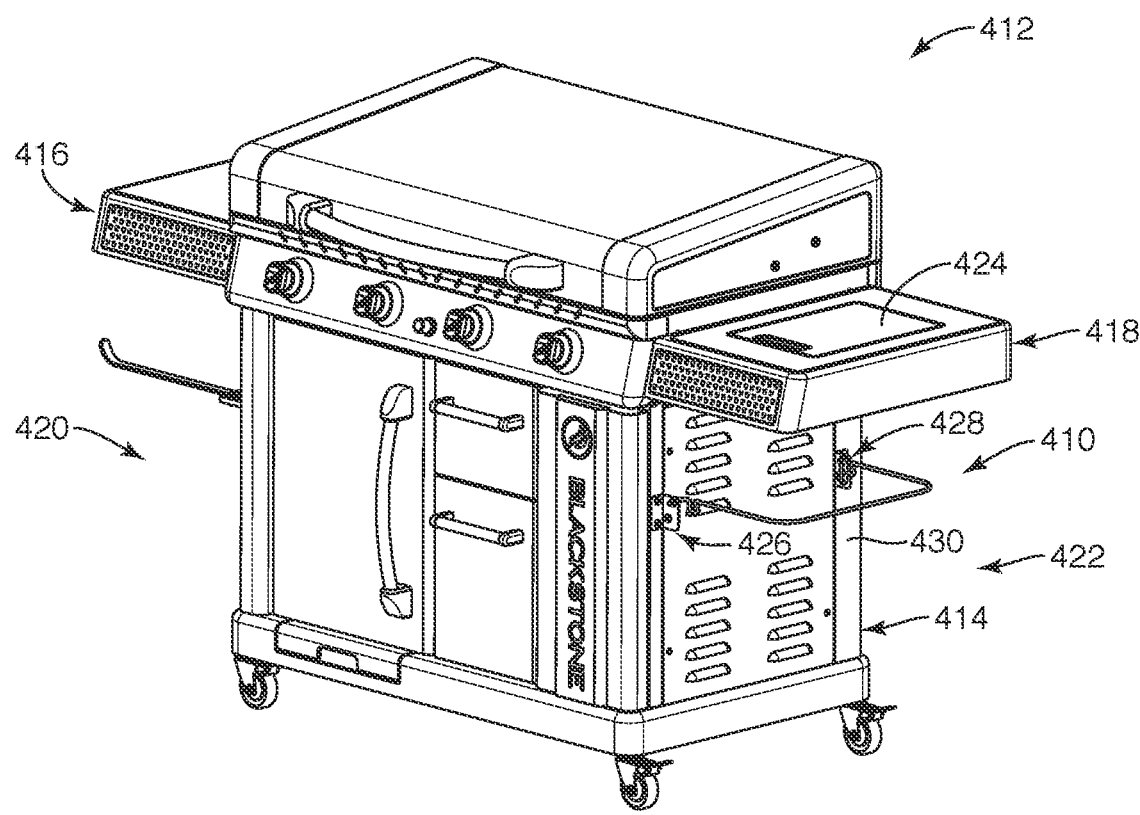
FIG. 20 is a perspective view of another embodiment of a waste bag holder coupled to a cooking station with brackets, depicting the waste bag holder in a use position, according to the present invention.
Figure 21:
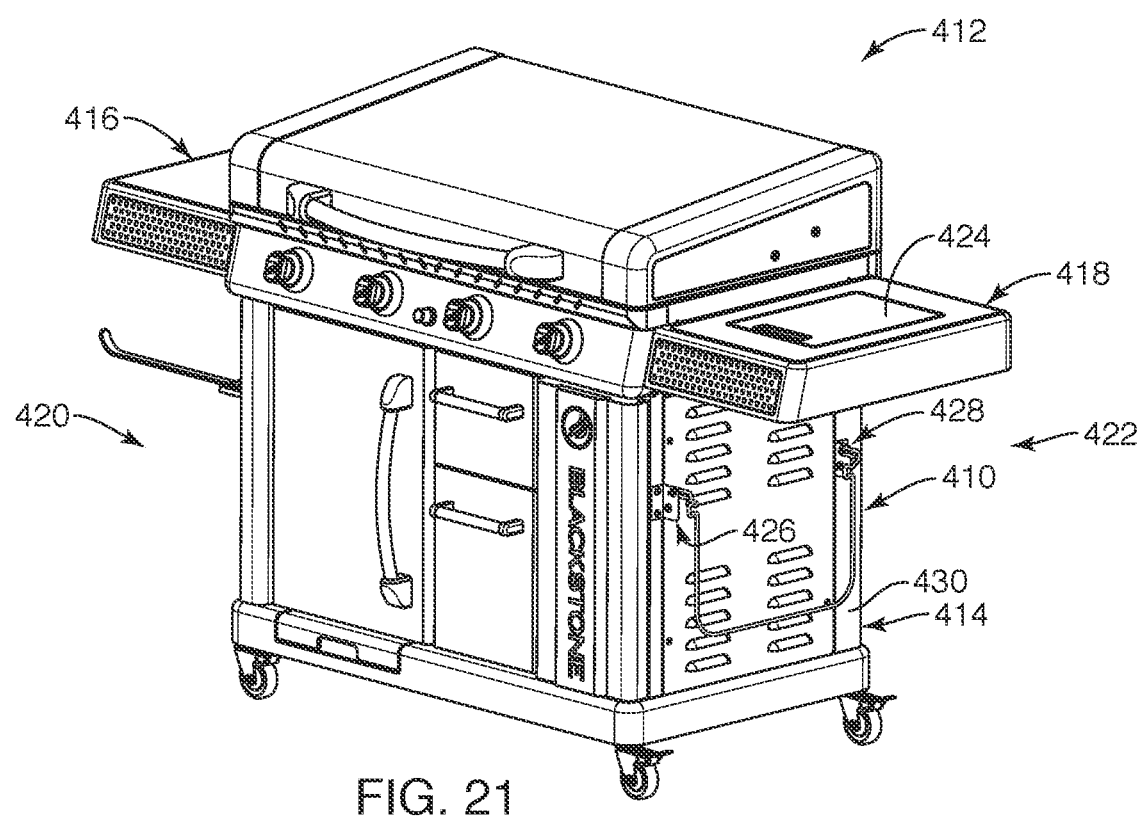
FIG. 21 is a perspective view of the waste bag holder and outdoor cooking station of FIG. 20, depicting the waste bag holder in a stowed position, according to another embodiment of the present invention.

With reference to FIGS. 20 and 21, another embodiment of a waste bag holder 410 that may be employed with an outdoor cooking station 412 is provided. In this embodiment, the waste bag holder 410 may be one part of a waste bag holder system 411. As in previous embodiments, the outdoor cooking station 412 may be a gas fueled type cooking station, or any other type of cooking station, fueled with wood, lump charcoal, charcoal briquettes, wood pellets, or any other type of fuel. Further, as in previous embodiments, the outdoor cooking station 412 may include a main body 414 with first and second side shelves 416, 418 on opposite first and second sides 420, 422, respectively, of the main body 414. Further, one or both of the first and second side shelves 416, 418 may include a cutting board 424 positioned within or associated with the first and second side shelves 416, 418, similar to that set forth in previous embodiments herein.

Further, as in the previous embodiments, the waste bag holder 410 may be sized and configured for holding a waste bag (similar to the waste bag 364 shown in FIG. 18). However, in this embodiment, the waste bag holder 410 is not readily removable from the cooking station 412. Further, in this embodiment, the waste bag holder 410 may be pivotably coupled to the outdoor cooking station 412. In one embodiment, the waste bag holder 410 may be operatively coupled to the outdoor cooking station 412 with first and second brackets 426, 428. For example, the waste bag holder 410 may be pivotably coupled to structure associated with the first and second brackets 426, 428 so as to be moveable between a use position and a stowed position (or folded or pivoted position). The use position may be a first position or primary position in which the holder 410 may generally extend in a horizontal orientation, the holder 410 sized and configured to hold a waste bag thereon, similar to that previously set forth. The stowed position may be a storage position such that the holder 410 may generally extend in a vertical orientation, the holder 410 pivotably moveable relative to the main body 414 of the cooking station 412 or the first and second brackets 426, 428. In this manner, the holder 410 may be in the use position and, if desired by the user of the cooking station 412, the holder 410 may be manually moved to a different orientation or position so as to extend alongside a vertically extending surface 430 of the main body 414 of the cooking station 412. Such vertical orientation or position of the holder 410 may be advantageous for purposes of minimizing a footprint for the region proximate the coupling of the holder 410 to the cooking station 412, for example.

Now reference to FIGS. 22-28, the waste bag holder 410 and its functionality will now be described without the cooking station shown in the drawings, for simplification purposes. With respect to FIGS. 22, 22A, 23A, 23B, and 24, the waste bag holder 410 is shown in the use position with the first and second brackets 426, 428. The waste bag holder 410 may include similar structural features as previous embodiments of the waste bag holder. For example, the waste bag holder 410 may extend with rod structure 432 having various bends along its length, the length extending between free ends 438. The waste bag holder 410 may extend with a u-shaped profile or u-shaped portion 435 having an outer extension 434 that may extend between first and second extensions 436, 438. The first and second extensions 436, 438 may each extend from opposite end portions 439 of the outer extension 434 so as to extend inward toward the respective first and second brackets 426, 428 and/or to respective first and second corner portions 440, 442 or bends in the rod structure 432. The first and second corner portions 440, 442 may at least partially be defined by ends or end portions 443 of the first and second extensions 436, 438 and u-shaped portion 435. The first and second corner portions 440, 442, in conjunction with the first and second extensions 436, 438 and outer extension 434 may act to support a waste bag (similar to waste bag 364 of FIG. 18), as set forth in previous embodiments.

The rod structure 432 from each of the first and second corner portions 440, 442 may extend downward and away from the corresponding first and second brackets 426, 428 so as to extend with an angle 444, as in previous embodiments. The rod structure 432 may extend at the angle 444 with an angled extension 446 relative to the respective first and second extensions 436, 438 such that the angled extension 446 may then extend with multiple bends to define first and second u-shape structures 448, 450. In another embodiment, the rod structure 432 may extend with the angled extension 446 to then extend with one or more bends so as to define respective first and second diverging portions 452, 454. Such first and second diverging portions 452, 454 may diverge outward from the respective first and second u-shaped structures 448, 450 of the holder 410. The first and second diverging portions 452, 454 may diverge outward to extend toward the corresponding first and second brackets 426, 428. Such first and second diverging portions 452, 454 may facilitate the first and second extensions 436, 438 of the u-shaped portion 435 from interfering with the first and second brackets 426, 428 upon the holder 410 being pivoted between the use and stowed positions.

Figure 22:
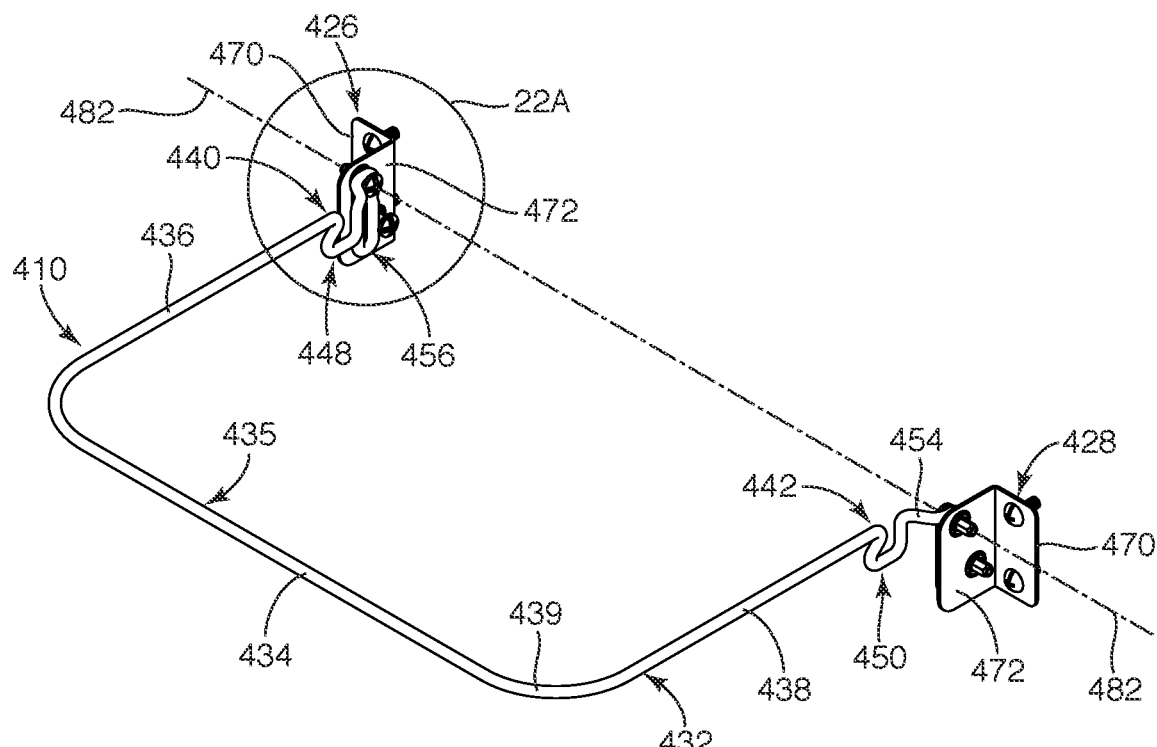
FIG. 22 is a perspective view of the waste bag holder in the use position coupled to the brackets, depicting the waste bag holder without the cooking station, according to another embodiment of the present invention.
Figure 22A:
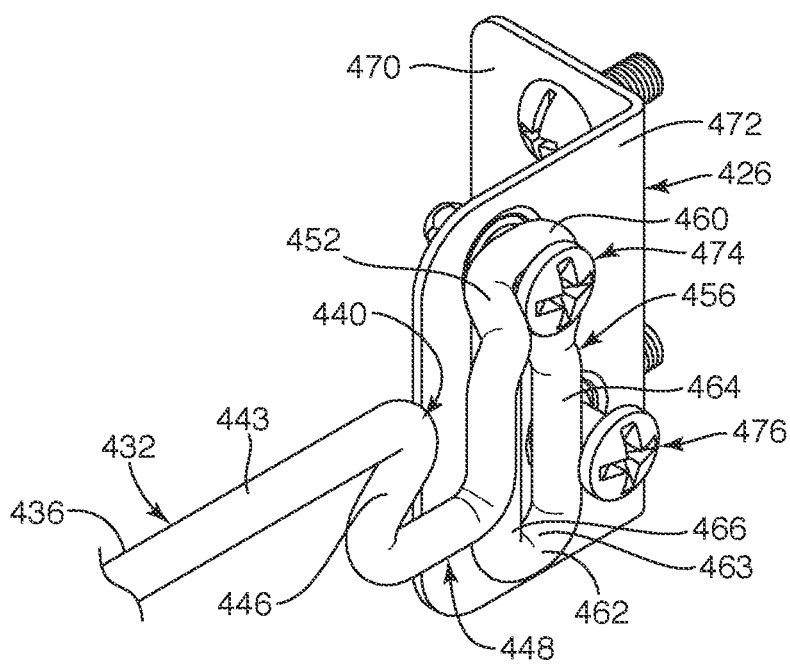
FIG. 22A is an enlarged view of the waste bag holder taken from region 22A of FIG. 22, according to another embodiment of the present invention.
Figure 23:
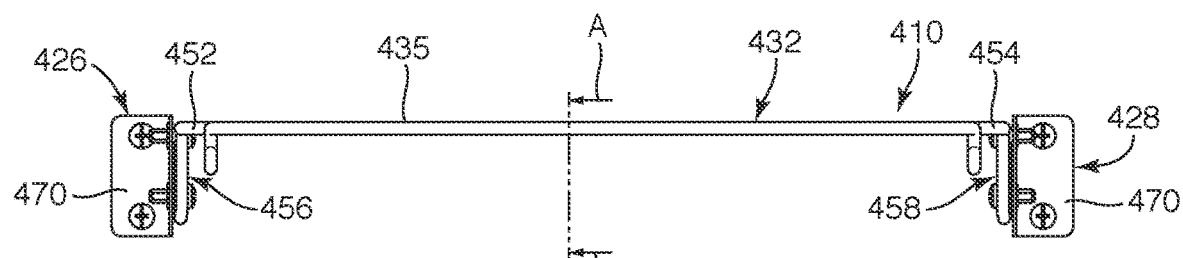
FIG. 23 is a front view of the waste bag holder and brackets of FIG. 22, according to another embodiment of the present invention.
Figure 23A:
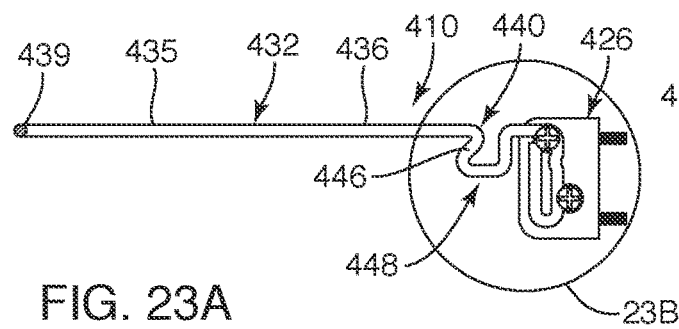
FIG. 23A is a cross-sectional view of the waste bag holder taken from section line A-A of FIG. 23, according to another embodiment of the present invention.
Figure 23B:
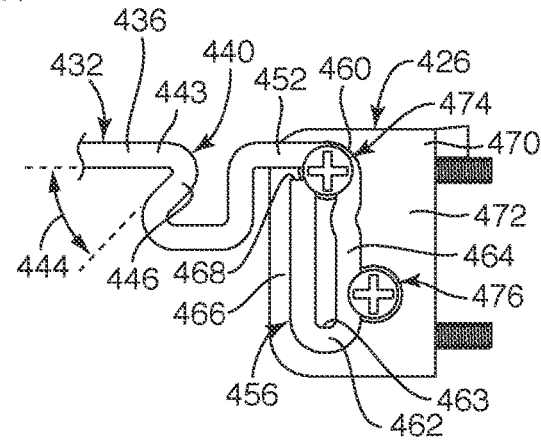
FIG. 23B is an enlarged view of the waste bag holder taken from region 23B of FIG. 23A, according to another embodiment of the present invention.
Figure 24:
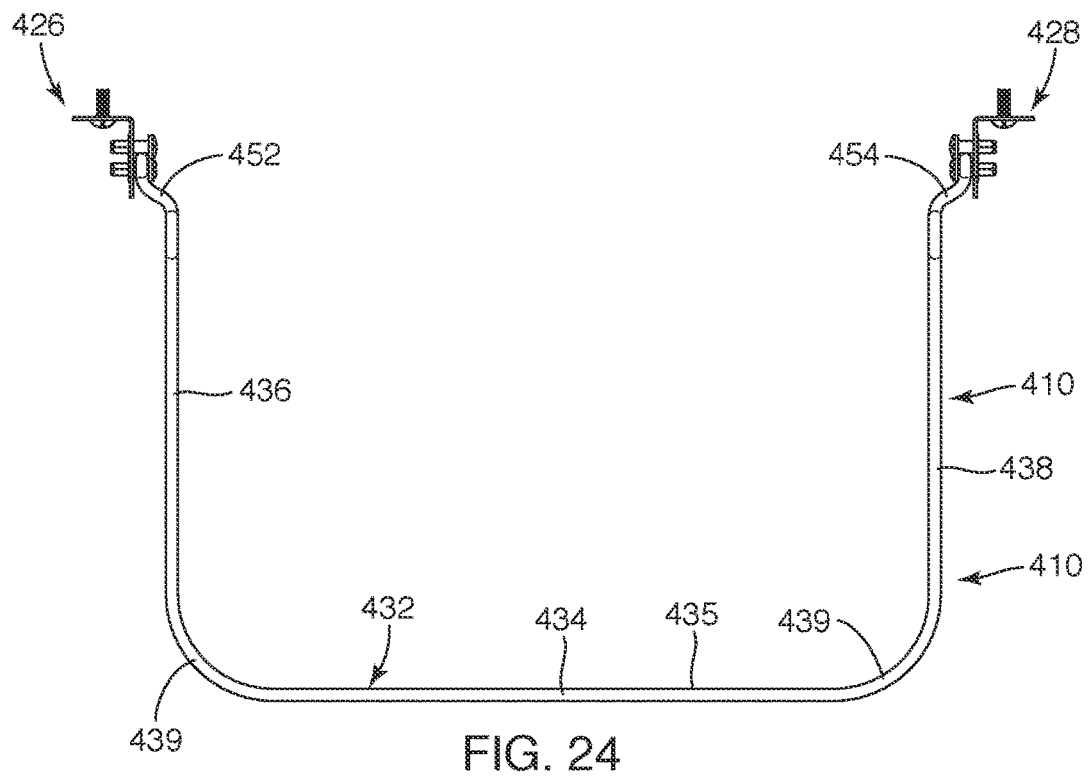
FIG. 24 is a top view of the waste bag holder and brackets of FIG. 22, according to another embodiment of the present invention.

Further, with respect to FIGS. 22A, 23 and 23B, from the first and second diverging portions 452, 454, the rod structure 432 may extend with first and second engaging portions 456, 458. Each of the first and second engaging portions 456, 458 may include a first bend 460 and a second bend 462 with a first elongate portion 464 between the first and second bends 460, 462. From the second bend 462, a second elongate portion 466 may extend toward a free end 468. Such first and second elongate portions 464, 466 may extend generally parallel relative to each other. In one embodiment, the first and second elongate portions 464, 466 and second bend 462 may exhibit a j-shaped structure. In another embodiment, at least one of the first and second bends 460, 462 may extend with a radial component 463 such that at least one of the first and second bends may also be referenced as first and second radial bends. Such first and second bends may also be referenced as first and second radial bends.

Now with reference to FIGS. 22, 22A and 23B, the first and second brackets 426, 428 will be described. Each of the first and second brackets 426, 428 may be L-shaped brackets with a base 470 and an outward extension 472, the outward extension 472 extending orthogonal relative to the base 470. The base 470 may be secured, for example, to the main body 414 of the outdoor cooking station 412 (see FIG. 20) with bolts such that the first and second brackets 426, 428 may be spaced to pivotably couple the holder 410 to the first and second brackets 426, 428. The outward extension 472 of the first and second brackets 426, 428 may include a coupling structure 474 and an abutment structure 476. The coupling structure 474 and the abutment structure 476 may be in the form of bolts or any other suitable structure to facilitate pivotably coupling the holder 410 thereto as well as to facilitate supporting or abutting the holder 410 at the use position, discussed further herein. Such coupling structure 474 and abutment structure 476 may be sized and configured to cooperate with the first and second engaging portions 456, 458 of the holder 410 to facilitate the holder 410 to be supported and moved between the use and stowed positions. In one embodiment, the coupling structure 474 for each of the first and second brackets 426, 428 may be axially aligned relative to each other. In another embodiment, the coupling structure 474 of each of the first and second brackets may define a pivot axis 482, the pivot axis 482 extending axially through the coupling structure 474 of each of the first and second brackets 426, 428. In another embodiment, the coupling structure 474 may define a radial structure that may correspond with the radial component 463 of the first or second bends 460, 462 of each of the first and second engaging members 456, 458 to facilitate pivoting or rotating the holder 410 about the aligned coupling structures 474. In another embodiment, at least one of the first and second bends 460, 462 of each of the first and second engaging portions 456, 458 of the holder 410 may include the radial component 463 so that the holder 410 may more readily pivot about the coupling structure 474. For example, in another embodiment, the second bend 462 of each of the first and second engaging portions 456, 458 may include an inner surface that extends with the radial component 463 to facilitate pivoting the holder 410 about the coupling structure 474. In another embodiment, the first and second bends 460, 462 may include the radial component 463 so that the first and second bends 460, 462 may nest and correspond with surface structure of the coupling structure 474 of the first and second engaging portions 456, 458. In this manner, the first and second bends 460, 462 having structure, such as the radial component 463, that corresponds with the structure of the coupling structure 474 may assist the holder 410 to remain stationary upon being in the use or stowed positions, as well as assist in the ease of pivoting the holder 410 between the use or stowed positions.

Upon the waste bag holder 410 being in the use position, the u-shaped portion 435 of the rod structure 432 may be supported in a generally horizontal orientation such that the u-shaped portion 435 may extend generally within a horizontally extending plane. Such horizontal orientation may be held or maintained with the first and second engaging portions 456, 458 of the holder 410 engaging the first and second brackets 426, 428, respectively. For example, in one embodiment, the first bend 460 of each of the first and second engaging portions 456, 458 may extend at least partially around the coupling structure 474 of the respective first and second brackets 426, 428. Further, the first elongate portion 464 extending from the first bend 460 of the first and second engaging portions 456, 458 may engage or abut the abutment structure 476 of the first and second brackets 426, 428. In this manner, the U-shaped portion 435 of the holder 410 may be suspended in the generally horizontal orientation, upon the holder 410 being in the use position.

Figure 25:
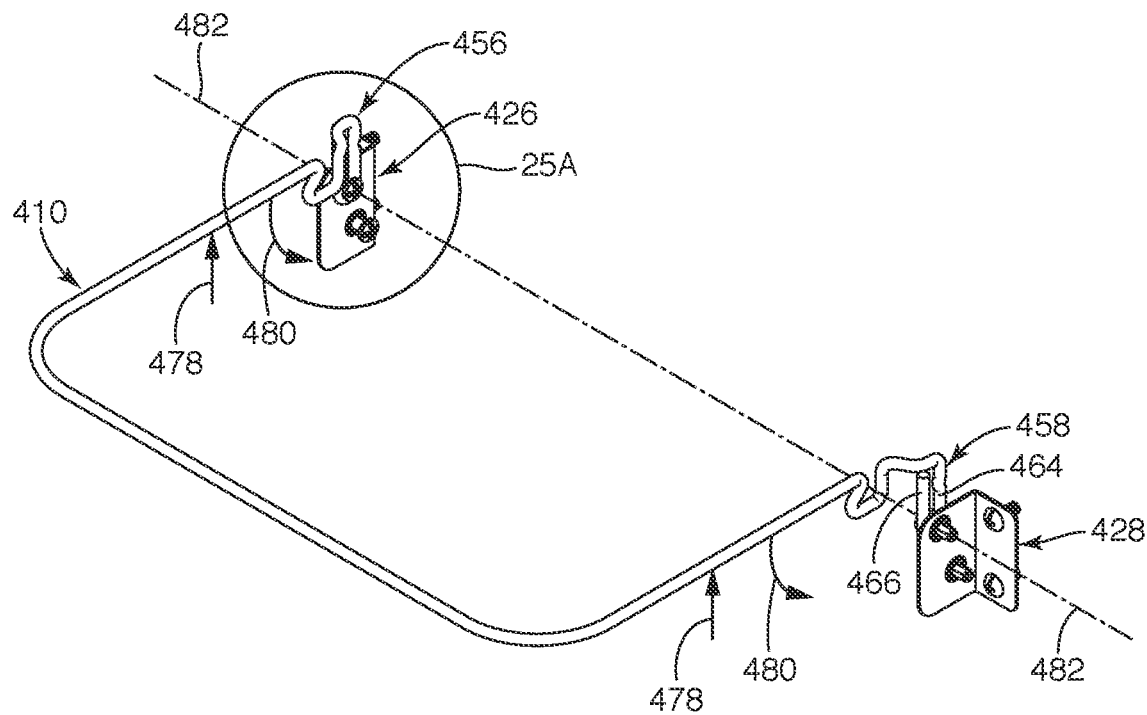
FIG. 25 is a perspective view of the waste bag holder, depicting the waste bag holder in a lifted position relative to the brackets, according to another embodiment of the present invention.
Figure 25A:
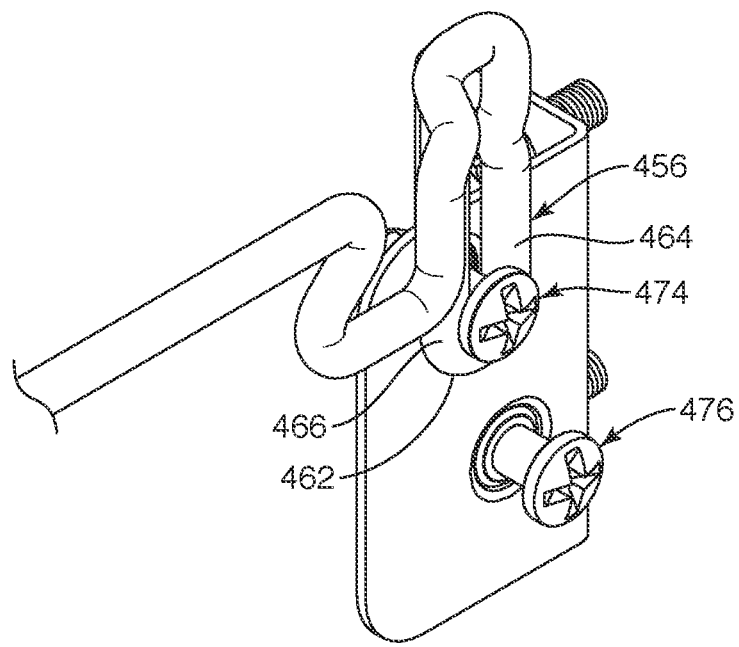
FIG. 25A is an enlarged view of the waste bag holder taken from region 25A of FIG. 25, according to another embodiment of the present invention.
Figure 27:
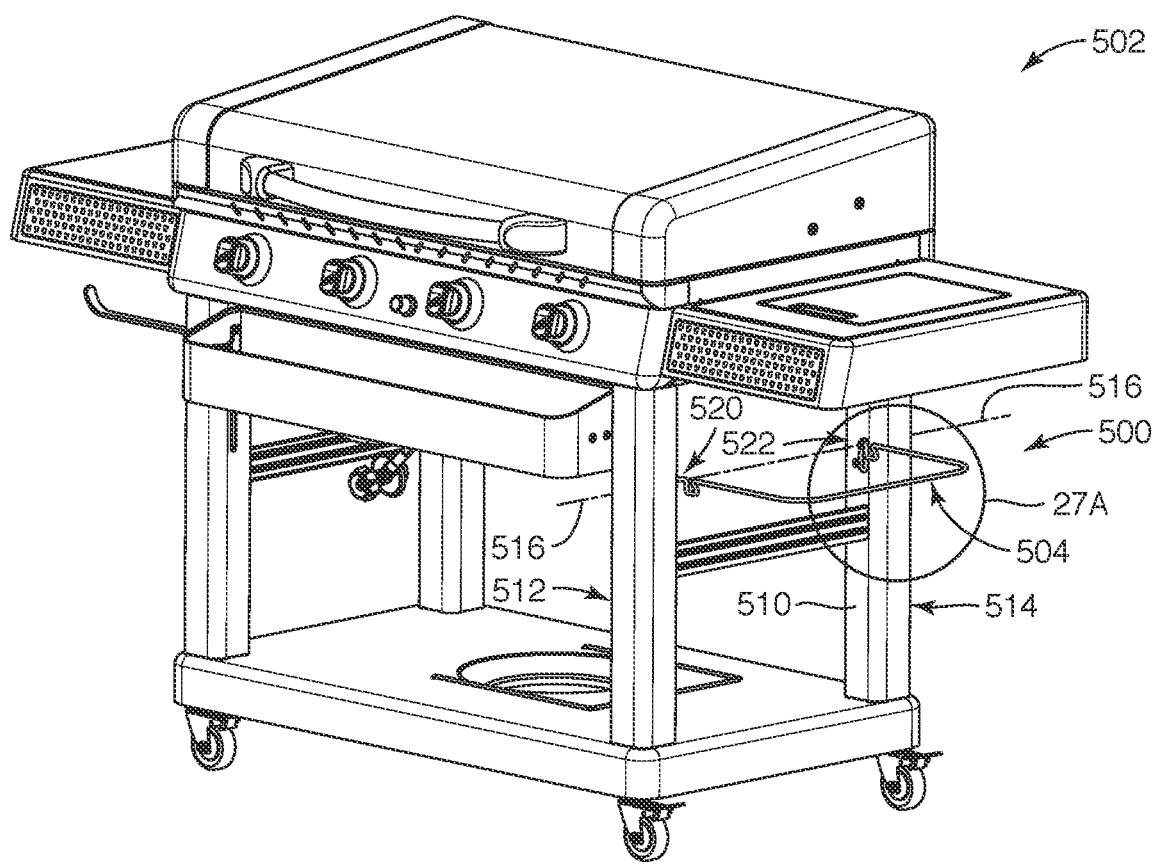
FIG. 27 is a perspective view of another embodiment of a waste bag holder system, depicting the waste bag holder system coupled to an outdoor cooking station with the holder in a use position, according to the present invention.
Figure 27A:
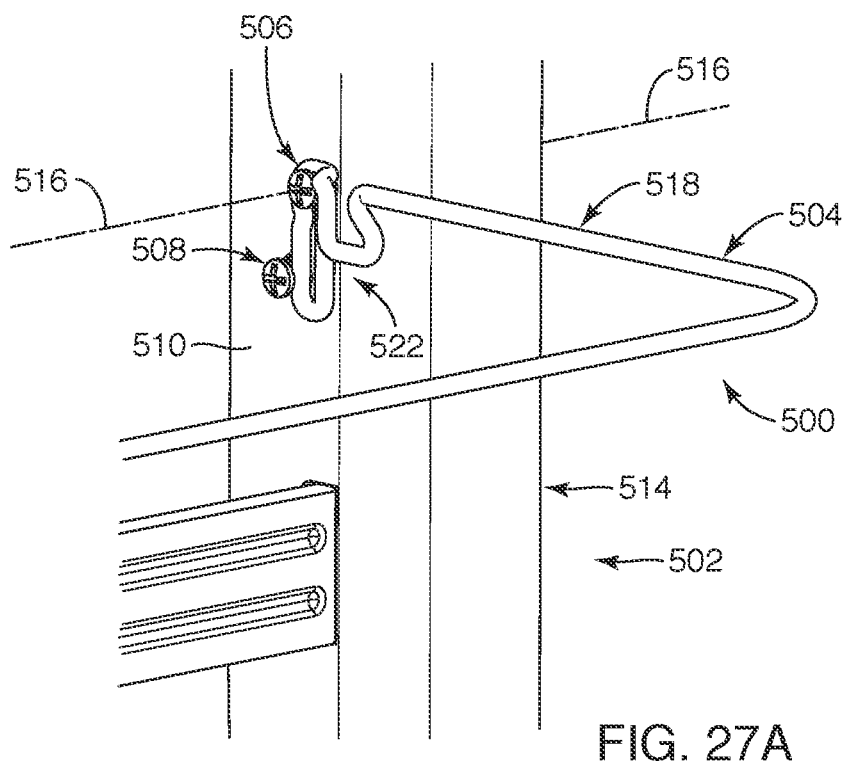
FIG. 27A is a perspective view of the waste bag holder taken from region 27A of FIG. 27, according to another embodiment of the present invention.
Figure 28:
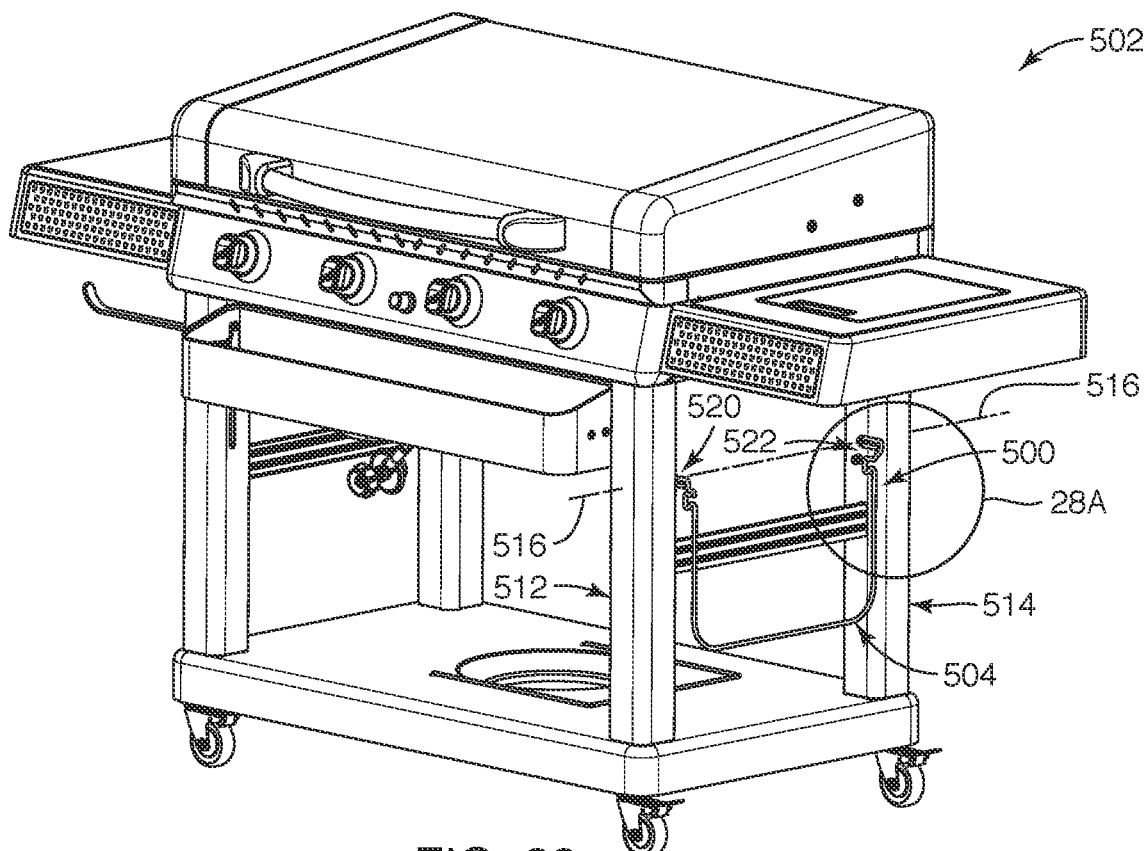
FIG. 28 is a perspective view of the waste bag holder of FIG. 27, depicting the waste bag holder positioned in a stowed position, according to another embodiment of the present invention.
Figure 28A:
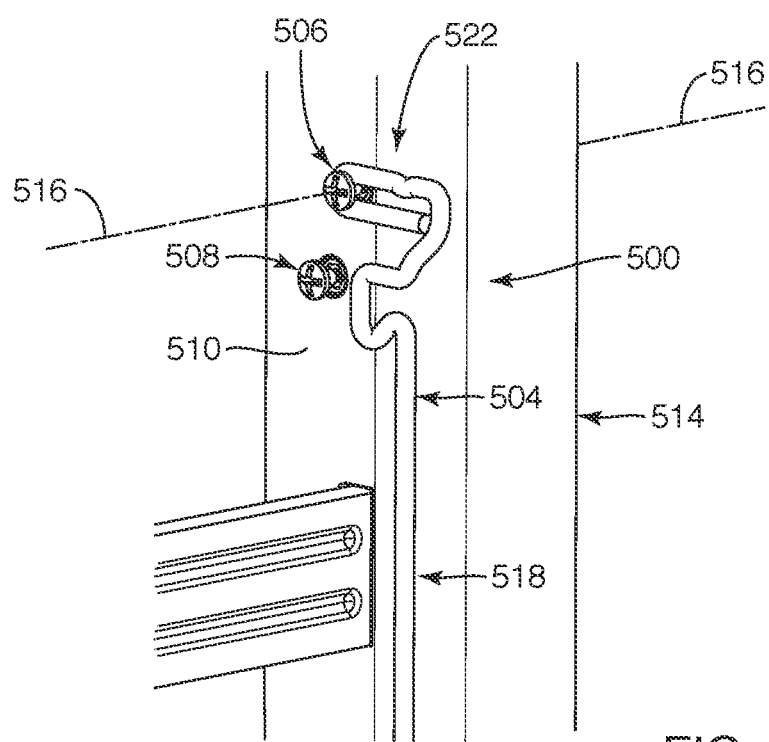
FIG. 28A is a perspective view of the waste bag holder taken from region 28A of FIG. 28, according to another embodiment of the present invention.

With reference to FIGS. 22, 25 and 25A, in order to proceed in moving the holder 410 from the use position or suspended horizontal position to the stowed position, the holder 410 may first be moved to a lifted position, as shown by arrow 478. For example, the first and second engaging members 456, 458 may be moved upward relative to the coupling structure 474 of the first and second brackets 426, 428 so that the coupling structure 474 may be moved between the first and second elongate portions 464, 466 toward the second bend 462. Upon the coupling structure 474 being positioned adjacent the second bend 462, the first elongate portion 464 may be moved away from the abutment structure 476 so that the first elongate portion 464 may be moved above the abutment structure 476 for bypassing the abutment structure 476 when moving the holder 410 to the stowed position. In the lifted position, the holder 410 may remain in the generally horizontal orientation.

With reference to FIGS. 25, 26, 26A, and 26B, upon the holder 410 being moved to the lifted position, the holder 410 may pivot or rotate about the pivot axis 482 and the coupling structure 474, as depicted by rotational arrow 480, so that the holder 410 may be moved to the stowed position. Such pivoting of the holder 410 may be implemented such that the second bend 462 of the first and second engaging portions 456, 458 of the holder 410 may move around the pivot axis 482 and the coupling structure 474 of the first and second brackets 426, 428, respectively. In the stowed position, the holder 410 may be positioned so as to extend in a generally vertical orientation. Upon the holder 410 being moved to the pivoted position or stowed position, the u-shaped portion 435 of the holder 410 may extend generally within a vertical plane or in the vertical orientation alongside the vertically extending surface 430 of the main body 414 of the outdoor cooking station 412, as depicted in FIG. 21.

As desired by the user, the holder 410 may be readily moved from the stowed position to the use position by pivoting the holder 410 upward from the stowed vertical position so that the u-shaped portion extends generally horizontally and then the holder 410 may be moved downward (opposite direction of arrow 478 in FIG. 25) so that the coupling structure 474 sits within the first bend 460 and the first elongate portion 464 abuts against the abutment structure 476, as depicted in FIGS. 22 and 22A. In this manner, the holder 410 may be readily pivoted and re-oriented from the vertical stowed position (FIG. 21) to the horizontal use position (FIG. 20). As depicted in FIGS. 20 and 21, such stowed position of the holder 410 may be advantageous for reasons of minimizing the footprint of the holder 410 so that the holder sits vertically alongside the main body 414 of the cooking station 412. Further, the horizontal use position of the holder 410 is advantageous to users to readily facilitate holding and supporting a trash bag in an open position around the u-shaped portion 435 of the holder 410 so that a user can better keep the area clean around the cooking station 412 while cooking food, similar to that discussed in previous embodiments herein.

With reference to FIGS. 27, 27A, 28 and 28A, another embodiment of a waste bag holder system 500 sized and configured to couple to an outdoor cooking station 502 is provided. In this embodiment, the waste bag holder system 500 may function in a similar manner as in the previous embodiment, except in this embodiment, the first and second brackets of the previous embodiment may not be employed with the system. For example, in this embodiment, the waste bag holder system 500 may include a waste bag holder 504 sized and configured to pivot about coupling structure 506 such that the waste bag holder 504 may be pivotably moveable between a use position and a stowed position. Further, the waste bag holder 504 may cooperate with an abutment structure 508, upon the waste bag holder 504 being in the use position. Further, in this embodiment, the coupling structure 506 and the abutment structure 508 may be fixed directly to a 503 main body of the cooking station 502. In one embodiment, the coupling structure 506 and the abutment structure 508 may be fixed directly to an inside surface 510 of a front vertically extending frame component 512 and a rear vertically extending frame component 514. In some embodiments, the coupling and abutment structures 506, 508 may be directly fixed to vertically extending frame components that may be legs. In another embodiment, the coupling structure 506 and/or the abutment structure 508 may be in the form of one or more bolts or the like. Similar to the previous embodiment, the coupling structures 506 fixed to each of the front and rear vertically extending frame components 512, 514 may be aligned so as to define a pivot axis 516 so that the waste bag holder 504 may be pivotably moved to the use and stowed positions. Further, the abutment structures 508 may be coupled to the main body, adjacent corresponding ones of the coupling structures 506, such that the abutment structures 508 may be aligned relative to each other. Further, the waste bag holder 504 of this embodiment may include similar structural and functional characteristics as in the previous embodiment. For example, the waste bag holder 504 may extend with a single piece rod structure with multiple bends along the length thereof to define a u-shaped portion 518 and first and second engaging portions 520, 522. Such first and second engaging portions 520, 522 may be sized and configured to cooperate with the coupling and abutment structures 506, 508, as described in the previous embodiment. Further, as in the previous embodiment, upon the waste bag holder 504 being positioned in the use position, the u-shaped portion 518 may extend with its components to sit substantially or generally within a horizontal plane, meaning that the u-shaped portion 518 may be oriented within the horizontal plane or may be oriented, as a whole, in a horizontal orientation. Upon the waste bag holder 504 being positioned in a stowed position, the u-shaped portion 518 may extend with its u-shaped components to sit substantially or generally within a vertical plane, meaning that the u-shaped portion may be oriented within the vertical plane or may be oriented, as a whole, in a vertical orientation or a substantially vertical orientation. In this manner, the waste bag holder 504 with its first and second engaging portions 520, 522 may be employed to abut or be supported in the use position as well as be manually lifted and pivoted to manually move the waste bag holder 504 between the use and stowed positions.

The various structural components of the various embodiments of the cooking station and the side shelf system and any other structural components thereof, such as the waste bag holder or other components, may be formed of various metallic materials, such as steel, stainless steel, copper, aluminum or any other suitable material with high temperature ratings, such as various suitable polymeric materials, and be formed from known structural components, such as sheet metal at various gauges/thicknesses or other known metallic structures, such as tubing and rod structure or the like, and may be formed and manufactured through various known processes in the art, such as casting, welding, rolling, bending, pressing, fastening, etc., as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An outdoor station configured to support a waste bag therewith, the outdoor station comprising:
   a main body with frame components and panels coupled together to form the main body;
   a first coupling structure and a second coupling structure each configured to be operatively coupled to the main body, the first and second coupling structures being aligned with each other so as to define a pivot axis;
   a first abutment structure and a second abutment structure each configured to be operatively coupled to the main body, the first and second abutment structures configured to be positioned adjacent the first and second coupling structures, respectively; and
   a waste bag holder extending with rod structure and configured to be pivotably coupled to the first and second coupling structures, the waste bag holder including:
      a u-shaped portion extending to first and second corner portions, the u-shaped portion and the first and second corner portions sized and configured to facilitate holding the waste bag thereto; and
      a first engaging portion and a second engaging portion, the first and second engaging portions including the rod structure extending from the respective first and second corner portions, the first and second engaging portions being pivotably coupled to the first and second coupling structures, respectively;
   wherein the waste bag holder is pivotably moveable about the pivot axis to at least one of a use position and a stowed position.

2. The outdoor station of claim 1, wherein, in the use position, the first and second engaging portions abut against the first and second abutment structures, respectively, so that the u-shaped portion is positionable within a generally horizontally oriented plane.

3. The outdoor station of claim 1, wherein, in the stowed position, the u-shaped portion is positionable within a generally vertically oriented plane such that the u-shaped portion extends along a vertically oriented surface of the main body.

4. The outdoor station of claim 1, wherein the rod structure extends to define a length extending between free ends such that the rod structure extends with multiple bends along the length.

5. The outdoor station of claim 1, wherein the rod structure is a single piece member extending to define a length between free ends, the rod structure extending with multiple bends along the length so as to define the waste bag holder.

6. The outdoor station of claim 1, wherein the first and second engaging portions each extend to define a first radial bend and a second radial bend with a first elongate portion extending therebetween, the waste bag holder pivotably moveable between the use and stowed positions such that the second radial bend rotates about the pivot axis and the first and second coupling structures.

7. The outdoor station of claim 1, wherein the first and second engaging portions each extend to define a first radial bend and a second radial bend with a first elongate portion extending therebetween, the waste bag holder positionable in the use position with the first radial bend of the first and second engaging portions positioned over the first and second coupling structures, respectively, and the first elongate portion of the first and second engaging portions positioned against the first and second abutment structures, respectively.

8. The outdoor station of claim 1, wherein the first and second engaging portions each extend to define a first radial bend and a second radial bend with a first elongate portion extending therebetween, wherein, prior to the waste bag holder being moved to the stowed position, the waste bag holder is moved to a lifted position such that the second radial bend is positioned adjacent the first and second coupling structures so that the waste bag holder is pivotable about the pivot axis to move the waste bag holder to the stowed position.

9. The outdoor station of claim 1, wherein the first and second corner portions are defined by an angled extension, the angled extension extending relative to the u-shaped portion such that the first and second corner portions each extend with an acute angle.

10. The outdoor station of claim 1, wherein the first and second coupling structures are directly coupled to first and second brackets, respectively, the first and second brackets configured to be directly coupled to the main body.

11. The outdoor station of claim 1, wherein the main body is configured to support one or more heating elements in the main body, the main body including a cooking surface associated therewith, the cooking surface configured to be heated by the one or more heating elements.

12. An outdoor station configured to support a waste bag therewith, the outdoor station comprising:
   a main body with frame components and panels coupled together to form the main body;
   first and second brackets sized and configured to be coupled to the main body, the first and second brackets each including a coupling structure and an abutment structure, the coupling structure of the first and second brackets being aligned with each other so as to define a pivot axis; and
   a waste bag holder extending with rod structure to define a u-shaped portion and first and second engaging portions, the u-shaped portion sized and configured to facilitate holding the waste bag thereto, the first and second engaging portions being pivotably coupled to the coupling structure of the first and second brackets, respectively, such that the waste bag holder is configured to be pivotably moveable about the pivot axis to move the waste bag holder to at least one of a use position and a stowed position.

13. The outdoor station of claim 12, wherein, in the use position, the first and second engaging portions abut against the first and second abutment structures, respectively, so that the u-shaped portion is positionable within a generally horizontally oriented plane.

14. The outdoor station of claim 12, wherein, in the stowed position, the u-shaped portion is positionable within a generally vertically oriented plane such that the u-shaped portion extends along a vertically oriented surface of the main body.

15. The outdoor station of claim 12, wherein the rod structure extends to define a length extending between free ends such that the rod structure extends with multiple bends along the length.

16. The outdoor station of claim 12, wherein the rod structure is a single piece member extending to define a length between free ends, the rod structure extending with multiple bends along the length so as to define the waste bag holder.

17. The outdoor station of claim 12, wherein the first and second engaging portions each extend to define a first radial bend and a second radial bend with a first elongate portion extending therebetween, the waste bag holder pivotably moveable between the use and stowed positions such that the second radial bend rotates about the pivot axis and the coupling structure.

18. The outdoor station of claim 12, wherein the first and second engaging portions each extend to define a first radial bend and a second radial bend with a first elongate portion extending therebetween, the waste bag holder positionable in the use position with the first radial bend positioned over the coupling structure, and the first elongate portion positioned against the abutment structure.

19. The outdoor station of claim 12, wherein the first and second engaging portions each extend to define a first radial bend and a second radial bend with a first elongate portion extending therebetween, wherein, prior to the waste bag holder being moved to the stowed position, the waste bag holder is moved to a lifted position such that the second radial bend is positioned adjacent the coupling structure so that the waste bag holder is pivotable about the pivot axis to move the waste bag holder to the stowed position.

20. The outdoor station of claim 12, wherein the main body is configured to support one or more heating elements in the main body, the main body including a cooking surface associated therewith, the cooking surface configured to be heated by the one or more heating elements.

* * * * *